US012597790B2

(12) United States Patent
Sanchez

(10) Patent No.: US 12,597,790 B2
(45) Date of Patent: *Apr. 7, 2026

(54) WIRELESS CHARGING SYSTEM FOR WEARABLE RING WITH LED ACTIVITY INDICATORS

(71) Applicant: QUANATA, LLC, San Francisco, CA (US)

(72) Inventor: Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/189,687

(22) Filed: Apr. 25, 2025

(65) Prior Publication Data

US 2025/0253691 A1 Aug. 7, 2025

Related U.S. Application Data

(63) Continuation of application No. 18/980,230, filed on Dec. 13, 2024, now Pat. No. 12,537,385, which is a (Continued)

(51) Int. Cl.
H02J 7/00 (2026.01)
A44C 9/00 (2006.01)
(Continued)

(52) U.S. Cl.
CPC .......... H02J 7/0045 (2013.01); A44C 9/0053 (2013.01); H02J 7/00032 (2020.01);
(Continued)

(58) Field of Classification Search
CPC .................................................. H02J 7/0045
(Continued)

(56) References Cited

U.S. PATENT DOCUMENTS 2,737,192 A 3/1956 Bieler
3,792,192 A 2/1974 Plate
(Continued)

FOREIGN PATENT DOCUMENTS

AU 2017324615 A1 2/2019
CN 103109462 A 5/2013
(Continued)

OTHER PUBLICATIONS

Oura Ring 2 Teardown: Inside the NBA's COVID-19-Detecting Smart Ring, available at < https://www.youtube.com/watch?v=BwA1hmSVgVY> (Script) Jul. 9, 2020.
(Continued)

*Primary Examiner* — Yalkew Fantu
(74) *Attorney, Agent, or Firm* — BRYAN CAVE LEIGHTON PAISNER LLP

(57) ABSTRACT

A charging system can include a housing. The housing can include an inner surface configured to contact a finger of a user when the housing is worn by the user. The housing also can include an internal power source configured to be wirelessly charged by a removable power source that is removably coupled to the housing. The housing further can include a component configured to draw energy from the internal power source. The charging system also can include a first LED activated in response to a first activity at the removable power source. The charging system further can include a second LED activated in response to a second activity at the removable power source. The second LED can be different from the first LED. The second activity can be different from the first activity. Other embodiments are disclosed.

20 Claims, 6 Drawing Sheets

Related U.S. Application Data continuation of application No. 18/661,982, filed on May 13, 2024, now Pat. No. 12,191,692, which is a continuation of application No. 16/926,262, filed on Jul. 10, 2020, now Pat. No. 11,984,742.

(60) Provisional application No. 62/877,391, filed on Jul. 23, 2019, provisional application No. 62/992,328, filed on Mar. 20, 2020.

(51) Int. Cl.
*H02J 7/02* (2016.01)
*H02J 50/00* (2016.01)
*H02J 50/10* (2016.01)

(52) U.S. Cl.
CPC .............. *H02J 7/02* (2013.01); *H02J 50/001* (2020.01); *H02J 50/10* (2016.02)

(58) Field of Classification Search
USPC ........................................................ 320/108
See application file for complete search history.

(56) References Cited

U.S. PATENT DOCUMENTS

| | | | |
|---|---|---|---|
| 4,012,629 A | 3/1977 | Simms | |
| 4,382,112 A | 5/1983 | Betts et al. | |
| 4,684,687 A | 8/1987 | Breach et al. | |
| 4,830,014 A | 5/1989 | Goodman et al. | |
| 4,880,304 A | 11/1989 | Jaeb et al. | |
| 5,135,220 A | 8/1992 | Baldoni | |
| 6,097,480 A | 8/2000 | Kaplan | |
| 6,154,658 A | 11/2000 | Caci | |
| 6,201,698 B1 | 3/2001 | Hunter | |
| 6,560,993 B1 | 5/2003 | Bosque et al. | |
| 6,608,562 B1 | 8/2003 | Kimura et al. | |
| 6,699,199 B2 | 3/2004 | Asada et al. | |
| 6,745,061 B1 | 6/2004 | Hicks et al. | |
| 6,792,044 B2 | 9/2004 | Peng et al. | |
| 6,800,693 B2 | 10/2004 | Nishihara et al. | |
| 6,803,391 B2 | 10/2004 | Paglia et al. | |
| 6,805,140 B2 | 10/2004 | Velez, Jr. et al. | |
| 6,894,628 B2 | 5/2005 | Marpe et al. | |
| 6,909,753 B2 | 6/2005 | Meehan et al. | |
| 6,959,116 B2 | 10/2005 | Sezer et al. | |
| 7,013,674 B2 | 3/2006 | Kretchmer | |
| 7,136,532 B2 | 11/2006 | VanDer | |
| 7,190,986 B1 | 3/2007 | Hannula et al. | |
| 7,227,894 B2 | 6/2007 | Lin et al. | |
| 7,286,710 B2 | 10/2007 | Marpe et al. | |
| 7,468,036 B1 | 12/2008 | Rulkov et al. | |
| 7,500,697 B2 | 3/2009 | Romack | |
| 7,500,746 B1 | 3/2009 | Howell et al. | |
| 7,519,229 B2 | 4/2009 | Wallace et al. | |
| 7,689,437 B1 | 3/2010 | Teller et al. | |
| 7,872,444 B2 | 1/2011 | Hamilton et al. | |
| 8,031,172 B2 | 10/2011 | Kruse et al. | |
| 8,075,484 B2 | 12/2011 | Moore-Ede | |
| 8,345,752 B2 | 1/2013 | Lee et al. | |
| 8,446,275 B2 | 5/2013 | Utter, II | |
| 8,554,297 B2 | 10/2013 | Moon et al. | |
| 8,570,273 B1 | 10/2013 | Smith | |
| 8,624,554 B2 | 1/2014 | Ajagbe | |
| 8,700,111 B2 | 4/2014 | Leboeuf et al. | |
| 8,954,135 B2 | 2/2015 | Yuen et al. | |
| 9,218,058 B2 | 12/2015 | Bress et al. | |
| 9,248,839 B1 | 2/2016 | Tan | |
| 9,248,938 B2 | 2/2016 | Hopps | |
| 9,265,310 B2 | 2/2016 | Lam | |
| 9,362,775 B1 | 6/2016 | Jacobs | |
| 9,420,260 B2 | 8/2016 | McGregor et al. | |
| 9,440,657 B1 | 9/2016 | Fields et al. | |
| 9,477,146 B2 | 10/2016 | Xu et al. | |
| 9,509,170 B2 | 11/2016 | Wu | |
| 9,628,707 B2 | 4/2017 | Blum et al. | |
| 9,660,488 B2 * | 5/2017 | Breedvelt-Schouten ................... H02J 50/12 | |
| 9,696,690 B2 | 7/2017 | Nguyen et al. | |
| 9,711,060 B1 * | 7/2017 | Lusted .............. A61B 5/02416 | |
| 9,711,993 B2 | 7/2017 | Kim | |
| 9,717,949 B1 | 8/2017 | Tran et al. | |
| 9,733,700 B2 | 8/2017 | Song et al. | |
| 9,756,301 B2 | 9/2017 | Li et al. | |
| 9,841,331 B2 | 12/2017 | Wood et al. | |
| 9,847,020 B2 | 12/2017 | Davis | |
| 9,861,314 B2 | 1/2018 | Haverinen et al. | |
| 9,880,620 B2 | 1/2018 | Kienzle et al. | |
| 9,908,530 B1 | 3/2018 | Fields et al. | |
| 9,931,976 B1 | 4/2018 | Terwilliger et al. | |
| 9,955,286 B2 | 4/2018 | Segal | |
| 9,956,963 B2 | 5/2018 | Vijaya Kumar et al. | |
| 9,965,761 B2 | 5/2018 | Elangovan et al. | |
| 10,007,355 B2 | 6/2018 | Schorsch et al. | |
| 10,043,125 B2 | 8/2018 | Park | |
| 10,085,695 B2 | 10/2018 | Ouwerkerk et al. | |
| 10,099,608 B2 | 10/2018 | Cuddihy et al. | |
| 10,102,510 B2 | 10/2018 | Yau et al. | |
| 10,137,777 B2 | 11/2018 | Lu et al. | |
| 10,139,859 B2 | 11/2018 | Von Badinski et al. | |
| 10,252,016 B2 | 4/2019 | Pedro et al. | |
| 10,281,953 B2 | 5/2019 | Von Bandinski | |
| 10,303,867 B2 | 5/2019 | Schröder | |
| 10,315,557 B2 | 6/2019 | Terwilliger et al. | |
| 10,317,940 B2 | 6/2019 | Eim et al. | |
| 10,345,506 B1 | 7/2019 | Lyu | |
| 10,359,846 B2 | 7/2019 | Priyantha et al. | |
| 10,366,220 B2 | 7/2019 | Shapiro et al. | |
| 10,377,386 B2 | 8/2019 | Richmond | |
| 10,384,647 B2 | 8/2019 | Tayama | |
| 10,396,584 B2 | 8/2019 | Madau et al. | |
| 10,409,327 B2 | 9/2019 | Stotler | |
| 10,444,834 B2 | 10/2019 | Vescovi et al. | |
| 10,463,141 B2 | 11/2019 | Fitzgerald et al. | |
| 10,509,994 B1 | 12/2019 | Huynh | |
| 10,528,989 B1 | 1/2020 | Irey | |
| 10,564,628 B2 | 2/2020 | Hargovan et al. | |
| 10,629,175 B2 | 4/2020 | Yan et al. | |
| 10,664,842 B1 | 5/2020 | Bermudez et al. | |
| 10,693,872 B1 | 6/2020 | Larson et al. | |
| 10,701,067 B1 | 6/2020 | Ziraknejad et al. | |
| 10,703,204 B2 | 7/2020 | Hassan et al. | |
| 10,709,339 B1 | 7/2020 | Lusted | |
| 10,745,032 B2 | 8/2020 | Scheggi | |
| 10,762,183 B1 | 9/2020 | Charan et al. | |
| 10,768,666 B2 | 9/2020 | Von Badinski et al. | |
| 10,838,499 B2 | 11/2020 | Wang | |
| 10,842,429 B2 | 11/2020 | Kinnunen et al. | |
| 10,849,557 B2 | 12/2020 | Keating | |
| 10,893,833 B2 | 1/2021 | Haverinen et al. | |
| 10,944,745 B2 | 3/2021 | Kursun | |
| 11,227,060 B1 | 1/2022 | John et al. | |
| 11,237,640 B2 | 2/2022 | Zhu et al. | |
| 11,265,635 B2 | 3/2022 | Shankar | |
| 11,271,290 B2 | 3/2022 | McLear et al. | |
| 11,312,299 B1 | 4/2022 | Assam | |
| 11,479,258 B1 | 10/2022 | Sanchez | |
| 11,599,147 B2 | 3/2023 | Von Badinski et al. | |
| 11,601,424 B2 | 3/2023 | Fukuda | |
| 11,637,511 B2 | 4/2023 | Sanchez | |
| 11,714,494 B2 | 8/2023 | D'Amone et al. | |
| 11,868,178 B2 | 1/2024 | Von Badinski et al. | |
| 11,868,179 B2 | 1/2024 | Von Badinski et al. | |
| 11,894,704 B2 | 2/2024 | Sanchez | |
| 11,909,238 B1 | 2/2024 | Sanchez | |
| 11,914,780 B2 | 2/2024 | Wang et al. | |
| 11,923,791 B2 | 3/2024 | Sanchez | |
| 11,984,742 B2 * | 5/2024 | Sanchez ................ H02J 7/0045 | |
| 11,990,954 B2 | 5/2024 | Kato et al. | |
| 12,191,692 B2 * | 1/2025 | Sanchez .............. H02J 7/00032 | |
| 12,211,467 B2 | 1/2025 | Sanchez | |
| 12,237,700 B2 | 2/2025 | Sanchez et al. | |
| 2002/0042464 A1 | 4/2002 | Barclay et al. | |
| 2002/0091568 A1 | 7/2002 | Kraft et al. | |

(56)                References Cited

U.S. PATENT DOCUMENTS

| | | |
|---|---|---|
| 2002/0121831 A1 | 9/2002 | Egawa et al. |
| 2003/0077064 A1 | 4/2003 | Katayama |
| 2003/0142065 A1 | 7/2003 | Pahlavan |
| 2004/0090210 A1 | 5/2004 | Becker et al. |
| 2004/0102551 A1 | 5/2004 | Sato et al. |
| 2004/0118592 A1 | 6/2004 | Pehlert |
| 2004/0145256 A1 | 7/2004 | Miekka |
| 2004/0160635 A1 | 8/2004 | Ikeda et al. |
| 2004/0200235 A1 | 10/2004 | Kretchmer |
| 2005/0012648 A1 | 1/2005 | Marpe et al. |
| 2005/0030205 A1 | 2/2005 | Konoshima et al. |
| 2005/0054941 A1 | 3/2005 | Ting et al. |
| 2005/0062454 A1 | 3/2005 | Raghunath et al. |
| 2005/0133248 A1 | 6/2005 | Easter |
| 2005/0162523 A1 | 7/2005 | Darrell et al. |
| 2005/0185060 A1 | 8/2005 | Neven |
| 2005/0185843 A1 | 8/2005 | Kudoh |
| 2005/0185844 A1 | 8/2005 | Ono et al. |
| 2005/0230596 A1 | 10/2005 | Howell et al. |
| 2006/0002607 A1 | 1/2006 | Boncyk et al. |
| 2006/0069681 A1 | 3/2006 | Lauper |
| 2006/0080286 A1 | 4/2006 | Svendsen |
| 2006/0085477 A1 | 4/2006 | Phillips et al. |
| 2006/0089792 A1 | 4/2006 | Manber et al. |
| 2006/0211924 A1 | 9/2006 | Dalke et al. |
| 2006/0250043 A1 | 11/2006 | Chung |
| 2006/0271593 A1 | 11/2006 | De Mes et al. |
| 2007/0149222 A1 | 6/2007 | Hodko et al. |
| 2007/0159522 A1 | 7/2007 | Neven |
| 2007/0188626 A1 | 8/2007 | Squilla et al. |
| 2007/0200713 A1 | 8/2007 | Weber et al. |
| 2007/0223826 A1 | 9/2007 | Ridge et al. |
| 2008/0068559 A1 | 3/2008 | Howell et al. |
| 2008/0136587 A1 | 6/2008 | Orr |
| 2008/0174676 A1 | 7/2008 | Squilla et al. |
| 2008/0218684 A1 | 9/2008 | Howell et al. |
| 2008/0275309 A1 | 11/2008 | Stivoric et al. |
| 2009/0056703 A1 | 3/2009 | Mills et al. |
| 2010/0219989 A1 | 9/2010 | Asami et al. |
| 2011/0007035 A1 | 1/2011 | Shai |
| 2011/0080339 A1 | 4/2011 | Sun et al. |
| 2011/0224875 A1 | 9/2011 | Cuddihy et al. |
| 2012/0016245 A1 | 1/2012 | Niwa et al. |
| 2012/0075196 A1 | 3/2012 | Ashbrook et al. |
| 2012/0130203 A1 | 5/2012 | Stergiou et al. |
| 2012/0184367 A1 | 7/2012 | Parrott et al. |
| 2012/0218184 A1 | 8/2012 | Wissmar |
| 2012/0293107 A1 | 11/2012 | Ajagbe |
| 2012/0317024 A1 | 12/2012 | Rahman et al. |
| 2013/0106603 A1 | 5/2013 | Weast et al. |
| 2013/0211291 A1 | 8/2013 | Tran |
| 2013/0335213 A1 | 12/2013 | Sherony et al. |
| 2014/0091659 A1 | 4/2014 | Suzuki et al. |
| 2014/0107493 A1 | 4/2014 | Yuen et al. |
| 2014/0118704 A1 | 5/2014 | Duelli et al. |
| 2014/0120983 A1 | 5/2014 | Lam |
| 2014/0187160 A1 | 7/2014 | Prencipe |
| 2014/0218529 A1 | 8/2014 | Mahmoud et al. |
| 2014/0238153 A1 | 8/2014 | Wood et al. |
| 2014/0240132 A1 | 8/2014 | Bychkov |
| 2014/0244009 A1 | 8/2014 | Mestas |
| 2014/0267024 A1 | 9/2014 | Keller et al. |
| 2014/0274203 A1 | 9/2014 | Ganong, III |
| 2014/0309849 A1 | 10/2014 | Ricci |
| 2014/0361934 A1 | 12/2014 | Ely et al. |
| 2014/0361945 A1 | 12/2014 | Misra et al. |
| 2015/0003693 A1 | 1/2015 | Baca et al. |
| 2015/0019266 A1 | 1/2015 | Stempora |
| 2015/0028996 A1 | 1/2015 | Agrafioti |
| 2015/0029089 A1 | 1/2015 | Kim |
| 2015/0046996 A1 | 2/2015 | Slaby et al. |
| 2015/0062086 A1 | 3/2015 | Nattukallingal |
| 2015/0065090 A1 | 3/2015 | Yeh |
| 2015/0098309 A1 | 4/2015 | Adams |
| 2015/0124096 A1 | 5/2015 | Koravadi |
| 2015/0126824 A1 | 5/2015 | Leboeuf et al. |
| 2015/0133193 A1 | 5/2015 | Stotler |
| 2015/0158499 A1 | 6/2015 | Koravadi |
| 2015/0186092 A1 | 7/2015 | Francis et al. |
| 2015/0220109 A1 | 8/2015 | Von et al. |
| 2015/0277559 A1 | 10/2015 | Vescovi et al. |
| 2015/0338926 A1 | 11/2015 | Park et al. |
| 2015/0352953 A1 | 12/2015 | Koravadi |
| 2016/0028267 A1 | 1/2016 | Lee et al. |
| 2016/0098530 A1 | 4/2016 | Dill et al. |
| 2016/0189149 A1 | 6/2016 | MacLaurin et al. |
| 2016/0192407 A1 | 6/2016 | Fyfe et al. |
| 2016/0207454 A1 | 7/2016 | Cuddihy |
| 2016/0226313 A1 | 8/2016 | Okubo |
| 2016/0236692 A1 | 8/2016 | Kleen et al. |
| 2016/0266606 A1 | 9/2016 | Ricci |
| 2016/0292563 A1 | 10/2016 | Park |
| 2016/0317060 A1 | 11/2016 | Connor |
| 2016/0334901 A1 | 11/2016 | Rihn |
| 2016/0336758 A1 | 11/2016 | Breedvelt-Schouten et al. |
| 2016/0350581 A1 | 12/2016 | Manel et al. |
| 2016/0361032 A1 | 12/2016 | Carter et al. |
| 2017/0010677 A1 | 1/2017 | Roh et al. |
| 2017/0012925 A1 | 1/2017 | Tekin et al. |
| 2017/0024008 A1 | 1/2017 | Kienzle et al. |
| 2017/0026790 A1 | 1/2017 | Flitsch et al. |
| 2017/0042477 A1 | 2/2017 | Haverinen et al. |
| 2017/0053461 A1 | 2/2017 | Pal et al. |
| 2017/0057492 A1 | 3/2017 | Eddington et al. |
| 2017/0070078 A1 | 3/2017 | Hwang et al. |
| 2017/0075701 A1 | 3/2017 | Ricci et al. |
| 2017/0080952 A1 | 3/2017 | Gupta et al. |
| 2017/0090475 A1 | 3/2017 | Choi et al. |
| 2017/0109512 A1 | 4/2017 | Bower et al. |
| 2017/0129335 A1 | 5/2017 | Lu et al. |
| 2017/0131772 A1 | 5/2017 | Choi |
| 2017/0190121 A1 | 7/2017 | Aggarwal et al. |
| 2017/0192530 A1 | 7/2017 | Lee |
| 2017/0242428 A1 | 8/2017 | Pal et al. |
| 2017/0251967 A1 | 9/2017 | Premsukh |
| 2017/0336964 A1 | 11/2017 | Kim |
| 2017/0346635 A1 | 11/2017 | Gummeson et al. |
| 2017/0347895 A1 | 12/2017 | Wei et al. |
| 2017/0355377 A1 | 12/2017 | Vijaya Kumar et al. |
| 2017/0374074 A1 | 12/2017 | Stuntebeck |
| 2018/0025351 A1 | 1/2018 | Chen et al. |
| 2018/0025430 A1 | 1/2018 | Perl et al. |
| 2018/0032126 A1 | 2/2018 | Liu |
| 2018/0037228 A1 | 2/2018 | Biondo et al. |
| 2018/0039303 A1 | 2/2018 | Hashimoto |
| 2018/0052428 A1* | 2/2018 | Abramov ................ G06F 1/163 |
| 2018/0054513 A1 | 2/2018 | Ma |
| 2018/0068105 A1 | 3/2018 | Shapiro et al. |
| 2018/0093606 A1 | 4/2018 | Terwilliger et al. |
| 2018/0093610 A1 | 4/2018 | Sun et al. |
| 2018/0093672 A1 | 4/2018 | Terwilliger et al. |
| 2018/0115797 A1 | 4/2018 | Wexler et al. |
| 2018/0120891 A1 | 5/2018 | Eim |
| 2018/0120892 A1 | 5/2018 | Von Badinski et al. |
| 2018/0123629 A1 | 5/2018 | Wetzig |
| 2018/0167200 A1 | 6/2018 | High et al. |
| 2018/0174457 A1 | 6/2018 | Taylor |
| 2018/0178712 A1 | 6/2018 | Terwilliger et al. |
| 2018/0229674 A1 | 8/2018 | Heinrich et al. |
| 2018/0256027 A1 | 9/2018 | Lacher |
| 2018/0257668 A1 | 9/2018 | Tonshal |
| 2018/0262505 A1 | 9/2018 | Ligatti |
| 2018/0292901 A1* | 10/2018 | Priyantha ................ G06F 3/041 |
| 2018/0300467 A1 | 10/2018 | Kwong et al. |
| 2018/0322957 A1 | 11/2018 | Dill et al. |
| 2019/0004325 A1 | 1/2019 | Connor |
| 2019/0049267 A1 | 2/2019 | Huang |
| 2019/0083022 A1 | 3/2019 | Huang |
| 2019/0131812 A1* | 5/2019 | Lee ......................... G06F 3/015 |
| 2019/0155104 A1 | 5/2019 | Li et al. |
| 2019/0155385 A1 | 5/2019 | Lim et al. |
| 2019/0172289 A1 | 6/2019 | O'Toole et al. |
| 2019/0191998 A1 | 6/2019 | Heikenfeld et al. |
| 2019/0202464 A1 | 7/2019 | Mcgill |

(56) References Cited

U.S. PATENT DOCUMENTS

| | | |
|---|---|---|
| 2019/0213429 A1 | 7/2019 | Sicconi et al. |
| 2019/0229909 A1 | 7/2019 | Patel et al. |
| 2019/0230507 A1 | 7/2019 | Li et al. |
| 2019/0265868 A1 | 8/2019 | Penilla et al. |
| 2019/0286805 A1 | 9/2019 | Law et al. |
| 2019/0287083 A1 | 9/2019 | Wurmfeld et al. |
| 2019/0295440 A1 | 9/2019 | Hadad |
| 2019/0298173 A1 | 10/2019 | Lawrence et al. |
| 2019/0298265 A1 | 10/2019 | Keating |
| 2019/0313967 A1 | 10/2019 | Lee |
| 2019/0332140 A1 | 10/2019 | Wang et al. |
| 2019/0332787 A1 | 10/2019 | Graf et al. |
| 2019/0342329 A1 | 11/2019 | Turgeman |
| 2019/0357834 A1 | 11/2019 | Aarts et al. |
| 2020/0001895 A1 | 1/2020 | Scheggi |
| 2020/0005291 A1 | 1/2020 | Rakshit et al. |
| 2020/0005791 A1 | 1/2020 | Rakshit et al. |
| 2020/0062276 A1 | 2/2020 | Yuan et al. |
| 2020/0070840 A1 | 3/2020 | Gunaratne |
| 2020/0142497 A1 | 5/2020 | Zhu |
| 2020/0159896 A1 | 5/2020 | Shapiro et al. |
| 2020/0218238 A1 | 7/2020 | Wang |
| 2020/0356652 A1 | 11/2020 | Yamaguchi et al. |
| 2020/0391696 A1 | 12/2020 | Kato et al. |
| 2020/0401183 A1 | 12/2020 | Von Badinski et al. |
| 2021/0019731 A1 | 1/2021 | Rule et al. |
| 2021/0029112 A1 | 1/2021 | Palle et al. |
| 2021/0058692 A1 | 2/2021 | Shankar |
| 2021/0197849 A1 | 7/2021 | Tsuji |
| 2021/0382684 A1 | 12/2021 | Hachiya et al. |
| 2022/0083149 A1 | 3/2022 | Keller et al. |
| 2022/0233142 A1 | 7/2022 | Hasan et al. |
| 2022/0320899 A1 | 10/2022 | Sanchez et al. |
| 2023/0027131 A1 | 1/2023 | Sanchez et al. |
| 2023/0225671 A1 | 7/2023 | Kosman et al. |

FOREIGN PATENT DOCUMENTS

| | | |
|---|---|---|
| CN | 104799509 | 7/2015 |
| CN | 105960196 | 9/2016 |
| CN | 106360895 | 2/2017 |
| CN | 206213423 | 6/2017 |
| CN | 206333477 | 7/2017 |
| CN | 206371611 | 8/2017 |
| CN | 107139933 | 9/2017 |
| CN | 107260139 | 10/2017 |
| CN | 104157116 A | 12/2017 |
| CN | 105006103 B | 4/2018 |
| CN | 105841851 | 8/2018 |
| CN | 108900691 | 11/2018 |
| CN | 108926081 | 12/2018 |
| DE | 10201301233399 | 7/2013 |
| DE | 102015006677 | 11/2016 |
| DE | 102019116618 | 12/2020 |
| EP | 1223191 A1 | 7/2002 |
| EP | 1384752 A1 | 1/2004 |
| EP | 2281205 A1 | 2/2011 |
| EP | 2581856 | 4/2013 |
| JP | 200879676 | 4/2008 |
| KR | 20110012229 | 2/2011 |
| KR | 20170013067 | 2/2017 |
| KR | 20170087113 A | 7/2017 |
| KR | 1020170087113 | 7/2017 |
| KR | 101835991 B1 | 4/2018 |
| WO | 2001017421 | 3/2001 |
| WO | 2005114476 A1 | 12/2005 |
| WO | 2005124594 A1 | 12/2005 |
| WO | 2008008714 A1 | 1/2008 |
| WO | 2011132009 A2 | 10/2011 |
| WO | 2015077418 | 5/2015 |
| WO | 2017136940 | 8/2017 |
| WO | 2018000396 | 1/2018 |
| WO | 2018048563 A1 | 3/2018 |
| WO | 2018154341 | 8/2018 |
| WO | 2018164632 | 9/2018 |
| WO | 2018204811 | 11/2018 |
| WO | 2019082095 | 5/2019 |
| WO | 2019140528 | 7/2019 |
| WO | 2019180626 | 9/2019 |

OTHER PUBLICATIONS

Rhee et al., (2000). Artifact-resistant, power-efficient design of finger-ring plethysmographic sensors. I. Design and analysis. 4. 2792-2795 vol. 4. 10.1109/IEMBS.2000.901443. 2000.

Rhee et al., (2000). Artifact-resistant, power-efficient design of finger-ring plethysmographic sensors. II. Prototyping and benchmarking. 4. 2796-2799 vol. 4. 10.1109/IEMBS.2000.901444. 2000. Dynamic drinkware-type analysis for mestas.

Liu et al., (2009). UWave: Accelerometer-based personalized gesture recognition and its applications. Pervasive and Mobile Computing. 5. 657-675. 10.1016/j.pmcj.2009.07.007. 2009.

Trigueiros et al., (2019). A comparison of machine learning algorithms applied to hand gesture recognition. 2019.

Castaneda et al., (2018), Int J Biosens Bioelectron. 2018, "A review on wearable photoplethysmography sensors and their potential future applications in health care"; 4(4):195-202. doi:10.15406/ijbsbe.2018.04.00125. 2018.

Mendelson et al., (2006). A Wearable Reflectance Pulse Oximeter for Remote Physiological Monitoring. Conference proceedings : . . . Annual International Conference of the IEEE Engineering in Medicine and Biology Society. IEEE Engineering in Medicine and Biology Society. Conference. 1. 912-5. 10.1109/IEMBS.2006. 260137. 2006.

Smiley, S., Active RFID vs. Passive RFID: What's the Difference? https://www.atlasrfidstore.com/rfid-insider/active-rfid-vs-passive-rfid/?srsltid=AfmBOoqhNhYwPPUSENIXB8LarZMm3TVQ4ugn4nTNUhfpy-9yYC_j0wdm Mar. 2016.

Lawton, G., (2022). Active vs. passive RFID tags: Which to choose: TechTarget. Retrieved from: https://www.techtarget.com/searcherp/tip/Active-vs-passive-RFID-tags-Which-to-choose Nov. 2022.

Amma et al., (2010). Airwriting recognition using wearable motion sensors. ACM International Conference Proceeding Series. 10. 10.1145/1785455.1785465. 2010.

Zhou et al., (2012). Analysis and Selection of Features for Gesture Recognition Based on a Micro Wearable Device. International Journal of Advanced Computer Science and Applications. 3. 10.14569/IJACSA.2012.030101. 2012.

Rhee et al., (2001). Artifact-resistant power-efficient design of finger-ring plethysmographic sensors. IEEE transactions on biomedical engineering. 48. 795-805. 10.1109/10.930904. 2001.

Ying et al., (2007). Automatic Step Detection in the Accelerometer Signal. 10.1007/978-3-540-70994-7_14. 2007.

100 Best Inventions of 2020 https://time.com/collection/best-inventions-2020/ 2020.

Clark, B. A.. "Color in Sunglass Lenses*." Optometry and Vision Science 46 (1969): 825-840. 1969.

Rhee, Sokwoo. (2006). Design and analysis of artifact-resistive finger photoplethysmographic sensors for vital sign monitoring /. 2006.

Webster, J.G., Design of pulse oximeters Webster—Institute of Physics Publishing—2003 2003.

Park et al., (2011). E-gesture: A collaborative architecture for energy-efficient gesture recognition with hand-worn sensor and mobile devices. SenSys 2011—Proceedings of the 9th ACM Conference on Embedded Networked Sensor Systems. 359-360. 10.1145/1999995.2000034. 2011.

Teh et al., (2000). Embedding of electronics within thermoplastic polymers using injection moulding technique. Filtration Industry Analyst. 10-18. 10.1109/IEMT.2000.910703. 2000.

Sakai, Tadamoto. (1993). Encapsulation process for electronic devices using injection molding method. Advances in Polymer Technology. 12. 61-71. 10.1002/adv.1993.060120106. 1993.

Ardebili et al.—William Andrew—2019. Encapsulation technologies for electronic applications 2019.

(56)                    References Cited

OTHER PUBLICATIONS

Lawrence et al., (2009). Episodic Sampling: Towards Energy-efficient Patient Monitoring with Wearable Sensors. Conference proceedings : . . . Annual International Conference of the IEEE Engineering in Medicine and Biology Society. IEEE Engineering in Medicine and Biology Society. Conference. 2009. 6901-5. 10.1109/IEMBS.2009.5333615. 2009.

Silverman, A. (2002). Fifty Years of Glass-Making. Industrial & Engineering Chemistry. 18. 10.1021/ie50201a004. 2002.

Petropoulos et al., (2012). Flexible PCB-MEMS flow sensor. Procedia Engineering. 47. 236-239. 10.1016/j.proeng.2012.09.127. 2012.

Schlömer et al., (2008). Gesture Recognition with a Wii Controller. First publ. in: Proceedings of the 2nd International Conference on Tangible and Embedded Interaction 2008, Bonn, Germany, Feb. 18-20, 2008, pp. 11-14. 10.1145/1347390.1347395. 2008.

Rekimoto, J. (2001). GestureWrist and GesturePad: unobtrusive wearable interactiondevices. International Symposium on Wearable Computers, Digest of Papers. 21-27. 10.1109/ISWC.2001.962092. 2001.

Guidelines to Enhancing the Heart-Rate Monitoring Performance of Biosensing Wearables https://www.analog.com/en/resources/technical-articles/guidelines-to-enhancing-the-heartrate-monitoring-performance-of-biosensing-wearables.html 2019.

Krzyanowski, J. "How are PCB's made? A Beginner's Guide to the PCB Manufacturing Process" Retrieved from Knowledge zone https://vectorbluehub.com/how-are-pcbs-made 2023.

Ciprian, et al., (2013) Injection and Micro Injection of Polymeric . . . First edition of the International Scientific Conference Modern Technologies in Machine Manufacturing Technology TMCM ISSN 2067-3604, vol. V, No. 1/2013https://modtech.ro/international-journal/vol5no12013/Ciofu_Ciprian_1.pdf 2013.

Ross, R.J.. (2004). LCP injection molded packages—keys to JEDEC 1 performance. 1807-1811 vol. 2. 10.1109/ECTC.2004.1320364. 2004.

Murphy, K. (2012) Machine learning: a probabilistic perspective 2012.

Olofson et al., Machining of titanium alloys—Battelle Memorial Institute, Defense Metals Information Center—1965 1965.

Asada et al., "Mobile monitoring with wearable photoplethysmographic biosensors," in IEEE Engineering in Medicine and Biology Magazine, vol. 22, No. 3, pp. 28-40, May-Jun. 2003, doi: 10.1109/MEMB.2003.1213624 2003.

Chen et al., (2009). Monitoring Human Movements at Home Using Wearable Wireless Sensors. Engineering Faculty Presentations. 2009.

On the Heels of 1 Million Rings Sold, Oura Now Valued at $2.55 Billion https://www.businesswire.com/news/home/20220405006108/en/On-the-Heels-of-1-Million-Rings-Sold-Oura-Now-Valued-at-2.55-Billion#:~:text=SAN%20FRANCISCO%2D%2D(BUSINESS%20WIRE,of%20selling%201%2C000%2C000%20Oura%20Rings. Apr. 2022.

Lister et al., (2018) Optical properties of human skin https://www.spiedigitallibrary.org/journals/journal-of-biomedical-optics/volume-17/issue-9/090901/Optical-properties-of-human-skin/10.1117/1.JBO.17.9.090901.full 2018.

Uchino et al., (2000). Prediction of Optical Properties of Commercial Soda-Lime-Silicate Glasses Containing Iron. Journal of Non-Crystalline Solids. 261. 72-78. 10.1016/S0022-3093(99)00617-1. 2000.

Lawrence et al., (1989) "Pulse Oximetry" Anesthesiology: The journal of the American Society of Anesthesiologists, Inc. vol. 70 No. 1 1989.

Konig et al., (1998) "Reflectance Pulse Oximetry-Principles and obstetric application in the zurich system" Journal of Clinical Monitoring and Computing vol. 14 No. 6p. 3-6 1998.

Hill et al., (2024) The Best Smart Ring to Rule Them All Retrieved from: https://www.wired.com/gallery/best-smart-rings/ 2024.

Kaltenbach, F. (2004). Translucent Materials: Glass, Plastics, Metals 2004.

Zhu et al., (2011). Wearable Sensor-Based Hand Gesture and Daily Activity Recognition for Robot-Assisted Living. IEEE Transactions on Systems, Man, and Cybernetics, Part A. 41. 569-573. 10.1109/TSMCA.2010.2093883. 2011.

Stables et al., (2022). Why the Oura Ring Gen 3 was our wearable of the year. Retrieved from: https://www.wareable.com/wearable-tech/why-the-oura-ring-3-was-our-wearable-of-the-year-2022 2022.

Sun et al., (2013). Wireless Power Transfer for Medical Microsystems. 10.1007/978-1-4614-7702-0. 2013.

U.S. Appl. No. 61/768,279 2013.

Sleep Lab validation of a wellness ring detecting sleep patterns based on photoplethysmogram, actigraphy and body temperature published Feb. 9, 2016, to Kinnunen (Year: 2016) 2016.

Oura Ring 2 Teardown: Inside the NBA's COVID-19-Detecting Smart Ring, available at < https://www.youtube.com/watch?v=BwA1hmSVgVY> (Screenshot) Jul. 9, 2020.

Google translation of KR20170087113A (Year: 2016) 2016.

Adafruit, p. 1-2, available at: https://adafruit.com/product/2806, published Jun. 2019 (Year: 2019) 2019.

Laput et al., "Skin buttons: cheap, small, low-powered and clickable fixed-icon laser projectors", UIST '14: Proceedings of the 27th annual ACM symposium on User interface software and technology, Oct. 2014 pp. 389-394. 2014.

"How to find your ideal bedtime with the Oura app", available online at <https://web_archive.org/web/20191206205332/https://ouraring.com/how-to-find-your-ideal-bedtime-with-the-oura-app/ 2019, 8 pages. 2019.

"Vauxhall/Opel In-Car Wireless Charging", retrieved from <https://www.air-charge.com/aircharge-for-business/automotive/vauxhall-wireless- charging>, Oct. 2019, 4 pages. Oct. 2019.

"Wireless charging for smart ring/pointing devices" available online at <http://www.humavox.comismt_product/wireless-charging-for-smart-ringpointing-devices/>, Oct. 2019, 3 pages Oct. 2019.

ASU projection wearable: Live tomorrow today (world first launch @ CES 2016). (Dec. 2015). ASU Tech, YouTube. Retrieved from https://www.youtube.com/watch?v=Wdb5O-D7Y0Y Dec. 2016.

Brownell, L., "Low-cost wearables manufactured by hybrid 3D printing. Wyss Institute, Harvard," Retrieved from https://wyss.harvard.edu/news/low-cost-wearables-manufactured-by-hybrid-3d-printingt, Sep. 6, 2017, p. 11 Sep. 6, 2017.

Cetin, C., "Design, testing and implementation of a new authentication method using multiple devices," Graduate Theses and Dissertations, University of South Florida Scholar Commons. Retrieved from http://scholarcommons.usf.edu/etd/5660, Jan. 2015, pp. 61 Jan. 2015.

Charles Q. Choi, "Low Battery? New Tech Lets You Wirelessly Share Power", available online at <https://www.livescience.com/54790-new-tech-enables-wireless-charging.html>, May 19, 2016, 9 pages May 19, 2016.

Chen, X. A., et al., "Encore: 3D printed augmentation of everyday objects with printed-over, affixed and interlocked attachments," Nov. 5, 2015, pp. 73-82 2015.

Chen, X. A., et al., "Reprise: A design tool for specifying, generating, and customizing 3D printable adaptations on everyday objects," Oct. 16, 2016, pp. 29-39 Oct. 16, 2016.

E-Senses, "Personal vitamin D, sunlight and daylight coach", available online at <https://e-senses.com/>, 2019, 5 pages 2019.

Hipolite, W., "The 3D printed 0 Bluetooth Ring is one of the tiniest personal computers you will ever see," 3DPrint.com. Retrieved from https://3dprint.com/34627/o-bluetooth-ring-3d-printed/, Jan. 2015, pp. 5 Jan. 2015.

Hussain Almossawi, "This smart ring aims to provide better lives for people with sickle cell disease", retrieved from https://www.core77.com/projects/82131/This-Smart-Ring-Aims-to-Provide-Better-Lives-for-People-with-Sickle-Cell-Disease>, 2021, 9 pages. 2021.

Je et al., "PokeRing: Notifications by poking around finger", Proceedings of the 2018 CHI Conference on Human Factors in Computing Systems-CHI'18, 2018, paper 542, pp. 1-10. 2018.

Katharine Schwab, "Orii, the ring that turns your finger into a phone, is here", available online at <https://www.fastcompany.com/90399237/orii-the-ring-that-turns-your-finger-into-a-phone-is-here>, 2019, 4 pages. 2019.

(56) References Cited

OTHER PUBLICATIONS

Magno et al., "Self-sustainable smart ring for long-term monitoring of blood oxygenation", IEEE Access, 2019, pp. 115400-115408 2019.

Mahmud et al., Wearable technology for drug abuse detection: A survey of recent advancements, Smart Health, vol. 13, Aug. 2019, 100062 Aug. 2019.

Margaret, "The Orb: A Bluetooth headset that turns into a ring", Gadgets, BornRich, Jun. 2013, available online at <https://www.bornrich.com/the-orb-a-bluetooth-headset-that-turns-into-a-ring.html> 2013.

Nassi et al., "Virtual breathalyzer", Department pf Software and Information Systems Engineering, Ben-Gurion University of the Negev, Israel, 2016, 10 pages. 2016.

Neev Kiran, "SkinnySensor: Enabling Battery-Less Wearable Sensors Via Intrabody Power Transfer", Master Theses 694, University of Massachusetts Amherst, 2018, 63 pages. 2018.

Nerd-Fu, "Push present", Delicious Juice Dot Com, Apr. 2015, available online at <https://blog.deliciousjuice.com/2015/04/>. 2015.

Pablo E. Suarez, "NXT Ring—Your Digital-self at Hand", available online at <https://www.youtube.com/watch?v=9w7uxDHs7NY>, uploaded on Jun. 21, 2019, 2 pages. 2019.

Roumen et al., "NotiRing: A comparative study of notification channels for wearable interactive rings", Proceedings of the 33rd Annual ACM Conference on Human Factors in Computing Systems—CHI'15, 2015, pp. 2497-2500. 2015.

Sarah Jacobson Purewell, "Ringly review: The smart ring that be sexier", available online at <https://www.macworld.com/article/227133/ringly-review-the-smart-ring-that-could-be-sexier.html>, 2016, 10 pages. 2016.

Schwab, K., "This startup wants to kill passwords-a-replace them with jewelry. Fast Company, "Retrieved from https://www.fastcompany.com/90254843/this-startup-wants-to-kill-passwords-and-replace-them-with-jewelry, (Oct. 2018), pp. 7 2018.

Seung et al., "Nanopatterned Textile-Based Wearable Triboelectric Nanogenerator", ACS Nano, vol. 9, 2015, pp. 3501-3509. 2015.

Shane McGlaun, "Geek builds Bluetooth Smart Ring with OLED display", available online at <https://www.slashgear.com/geek-build-bluetooth-smart-ring-with-oled-display-02361383/>, 2015, 6 pages. 2015.

Sperlazza, "We tested four sleep trackers apps and wearables: Here are the best ones", available online at <https://www.bulletproof.com/sleep/tech/best-sleep-tracker-apps/>, 2019, 18 pages. 2019.

Turunen, "Smart ring for stress control and self-understanding", available online at <https://slowfinland.fi/en/smart-ring-for-stress-control-and-understanding/>, 2017, 9 pages. 2017.

Wochit Tech. (2017) New smart monitors UV exposure [Video file]. Retrieved from https://www.youtube.com/watch?v=4YvkioTZxjU, 3 pages. 2017.

Worgan et al., "Garment level power distribution for wearables using inductive power transfer", 9th International Conference on Human Systems Interactions (HSI), 2016, pp. 277-283. 2016.

Xiao et al., "LumiWatch: On-arm projected graphics and touch input", Proceedings of the 2018 CHI Conference on Human Factors in Computing Systems- CHI'18, 2018, pp. 1-11. 2018.

Zhu et al., "Developing a driving fatigue detection system using physiological sensors", Proceedings of the 29th Australian Conference on Computer-Human Interaction—OZCHI' 17, 2017, pp. 566-570. 2017.

Zhu, M. et al., "Fluidic fabric muscle sheets for wearable and soft robotics, "Retrieved from https://arxiv.org/pdf/1903.08253.pdf, Mar. 2019, pp. 32 2019.

https://en.wikipedia.org/w/index.php?title=Ring_size&oldid= 891328817 (Year: 2019) 2019.

Mario, https://www.smartringnews.com/posts/smart-ring-vs-smartwatch-which-is-the-best-fitness-and-activity-tracker (Year: 2014) 2014.

"The Oura App | Oura Ring", available online at <https://web.archive.org/web/20191019192921/https://ouraring.com/introducing-the-new-oura-app/>, 6 pages Oct. 29, 2019.

"Get the Technical Specs of Oura Ring | Oura Ring", available online at <https://web.archive.org/web/2019129014439/https://ouraring.com/tech-specs/>, 3 pages Jan. 29, 2019.

"Learn how the Oura ring works | Go inside | Oura Ring", available online at <https://web.archive.org/web/20181127193557/https://ouraring.com/how-oura-works/>, 5 pages Nov. 27, 2018.

Oura Ring Generation 1 User Manual, available online at < https://fccid.io/2AD7V-OURARING15001/User-Manual/User-Manual-2844448.pdf>, 8 pages Nov. 24, 2015.

Oura Ring Generation 2 User Manual, available online at < https://fccid.io/2AD7V-OURA1801/User-Manual/User-manual-v2-3856414.pdf>, 13 pages Mar. 27, 2018.

Oura ring. Improve sleep. Perform better. by OURA—Kickstarter, available online at <https://web.archive.org/web/20160427015852/https://www.kickstarter.com/projects/oura/oura-ring-improve-sleep-perform-better/description>, 27 pages Apr. 27, 2016.

Oura Ring review—The Gadgeteer, available online at < https://the-gadgeteer.com/2017/08/11/oura-ring-review/> 16 pages Aug. 11, 2017.

Ouraring.com JZ50-0112 user manual available with Gen 2 ring purchase, 2 pages.

Important Information Please Read JZ50-0148 user manual available with gen 2 ring purchase, 4 pages May 13, 2019.

Important Information Please Read JZ50-0149 user manual available with gen 2 ring purchase, 4 pages May 13, 2019.

Oura Ring | Sleep Tracker and Smart Ring with a Heart Rate Monitor, available online at <https://web.archive.org/web/20180709050831/https://ouraring.com/>, 12 pages Jul. 9, 2018.

Introducing the New Oura Ring Generation 3—The Pulse Blog, available online at <https://ouraring.com/blog/oura-generation2-vs-generation3/>, 3 pages Oct. 26, 2021.

* cited by examiner

WIRELESS CHARGING SYSTEM FOR WEARABLE RING WITH LED ACTIVITY INDICATORS

CROSS-REFERENCES TO RELATED APPLICATIONS

This application is a continuation of U.S. Non-Provisional application Ser. No. 18/980,230 filed on Dec. 13, 2024, which is a continuation of U.S. Non-Provisional application Ser. No. 18/661,982 filed on May 13, 2024, which is a continuation of U.S. Non-Provisional patent application Ser. No. 16/926,262 filed on Jul. 10, 2020, which claims the benefit of U.S. Provisional Patent Application No. 62/877,391 filed on Jul. 23, 2019, and U.S. Provisional Patent Application No. 62/992,328 filed on Mar. 20, 2020, all of which are incorporated by reference herein in their entirety for all purposes.

FIELD OF THE DISCLOSURE

The present disclosure generally relates to smart ring wearable devices and, more specifically, to smart ring devices with removable power sources in the environment for enabling charging when a user holds an object with an integrated charger while wearing the smart ring.

BACKGROUND

To the extent that smart ring technology has been adopted, it has a number of challenges. For example, a number of problems exist with wearable devices generally, including: they often need to be removed for charging; they often have poor fit; they often provide relatively little user interactivity; and they often provide limited functionality.

BRIEF SUMMARY

A smart ring may be configured with a removable power source and an internal power source. The internal power source may enable continued operation of the smart ring disposed at a finger of a user, while the removable power source may be detached from the smart ring for charging or to be replaced with another charged removable power source. The removable power source may be disposed as a platform at an outer surface of a band-shaped housing of the smart ring. When attached to the smart ring, the removable power source may charge the internal power source. Attaching the removable power source to the band-shaped housing with an adapter may add flexibility to configuring smart rings. Furthermore, the smart ring may operate in a variety of power modes depending on whether the removable power source is attached to the band-shaped housing. In some implementations, the band-shaped housing or the removable power source may include an energy-harvesting component configured to charge, respectively, the internal power source or the removable power source from ambient energy sources.

In one aspect, a smart ring comprises a band-shaped housing and a removable power source, the removable power source configured to be removably disposed as a platform at an outer surface of the band-shaped housing and to charge the internal power source. The band-shaped housing includes an internal power source and a component configured to draw energy from the internal power source. The component is further configured to perform any one or more of the following operations: i) sense a physical phenomenon external to the band-shaped housing, ii) send communication signals to a communication device external to the band-shaped housing, or iii) implement a user interface.

In another aspect, a method of operating a smart ring comprises attaching, to a band-shaped housing of the smart ring, a removable power source to be removably disposed as a platform at an outer surface of the band-shaped housing. The method further comprises transferring electrical energy from the removable power source to an internal power source disposed within the band-shaped housing. Still further, the method comprises drawing electrical energy from the internal power source by a component disposed within the band-shaped housing and performing, by the component drawing energy from the internal power source, any one or more of the following operations: i) sensing a physical phenomenon external to the band-shaped housing, ii) sending communication signals to a communication device external to the band-shaped housing, or iii) implementing a user interface.

In another embodiment, a ring includes a housing. The housing can include an inner surface configured to contact a finger of a user when the housing is worn by the user. The housing also can include a first power source configured to be wirelessly charged by a second power source that is removably coupled to the housing. The housing further can include a component configure to draw energy from the first power source. The component can perform one or more of: sensing an activity of the user wearing the housing or sending data to a communication device.

In another embodiment, one or more non-transitory computer-readable media can include computing instructions that, when executed on one or more processors, can cause the one or more processors to perform operations. The operations can include wirelessly transferring energy to a first power source disposed within a housing of a ring from a second power source that is removably coupled to the housing. The operations also can include drawing the energy from the first power source by a component of the housing. The operations further can include performing, by the component, one or more of: sensing an activity of a user wearing the housing or sending data to a communication device.

In another embodiment, a ring can include a housing. The housing can include a first power source configured to be charged by a second power source. The second power source can be removably coupled to an inner surface of the housing to charge the first power source. The inner surface of the housing can be configured to contact a finger of a user wearing the ring. The housing also can include a component configured to draw energy from the first power source. The component can perform one or more of: sensing an activity of the user wearing the housing or sending data to a communication device.

In another embodiment, a charging system can include a housing. The housing can include an inner surface configured to contact a finger of a user when the housing is worn by the user. The housing also can include an internal power source configured to be wirelessly charged by a removable power source that is removably coupled to the housing. The housing further can include a component configured to draw energy from the internal power source. The charging system also can include a first LED activated in response to a first activity at the removable power source. The charging system further can include a second LED activated in response to a second activity at the removable power source. The second LED can be different from the first LED. The second activity can be different from the first activity.

In another embodiment, a method of providing a charging system can include providing a housing. Providing the housing can include providing an inner surface configured to contact a finger of a user when the housing is worn by the user. Providing the housing also can include providing an internal power source configured to be wirelessly charged by a removable power source that is removably coupled to the housing. Providing the housing further can include providing a component configured to draw energy from the internal power source. The method of providing a charging system also can include providing a first LED activated in response to a first activity at the removable power source. The method of providing a charging system further can include providing a second LED activated in response to a second activity at the removable power source. The second LED can be different from the first LED. The second activity can be different from the first activity.

In another embodiment, a charging system can include a housing. The housing can include an inner surface configured to contact a finger of a user. The housing also can include an internal power source configured to be wirelessly charged by a removable power source that is removably coupled to the housing. The housing further can include a light source configured to draw energy from the internal power source. The charging system also can include a first LED activated in response to a first activity at the removable power source. The charging system further can include a second LED activated in response to a second activity at the removable power source. The second LED can be different from the first LED. The second activity can be different from the first activity.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION

Figure 1:
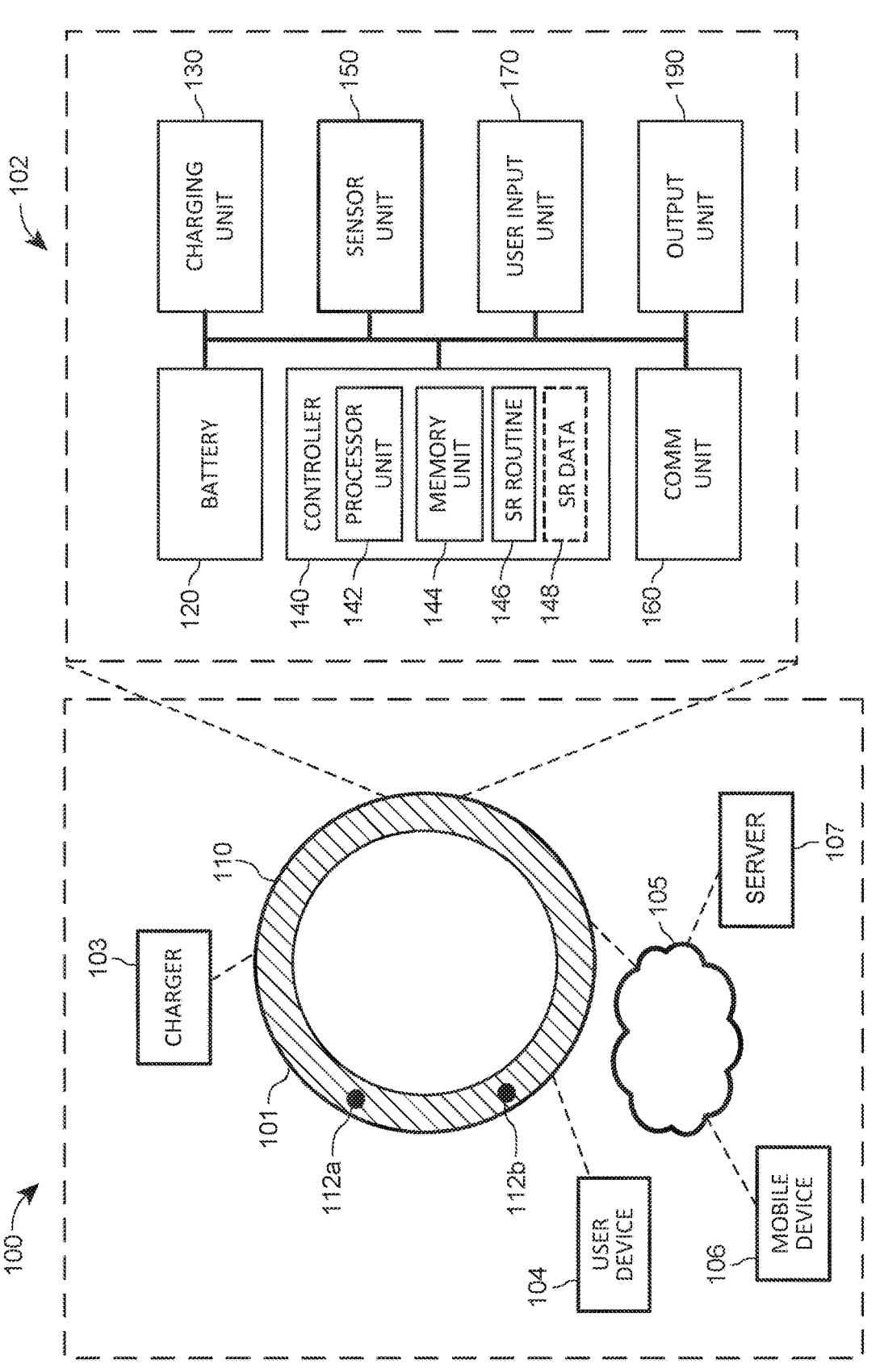
FIG. 1 illustrates a system comprising a smart ring and a block diagram of smart ring components according to some embodiments.

Smart ring wearable technology can enable a wide range of applications including security, safety, health and wellness, and convenient interfacing between a user and a variety of technologies based at least in part upon integrating a variety of sensor, input/output devices, and computing capabilities in a compact form factor. One of the challenges in increasing smart ring capabilities is reliably powering the needed components, particularly considering the limited space for a power source in the compact form factor. An ability to conveniently charge a power source of a smart ring without removing the smart ring from a finger would contribute to the adoption of smart ring technology.

One way to charge a smart ring without removing the smart ring from the finger may include using a removable power source. The removable power source may be disposed at an outer surface of the band-shaped housing of the smart ring, much as a jewel or another decorative element may be disposed at a band of a ring. We may refer to this as a band and platform configuration. The platform configuration may have some advantages in comparison to attaching a removable power source that has an annular shape in a side-by-side configuration with the band-shaped housing. For example, the band and platform configurations allow a variety of form factors and capacities in the removable power source. Furthermore, the power source need not be sized to the finger of the user. Also, an outer surface of the platform may integrate additional functionality, such as a display or an energy harvesting photovoltaic element.

Connecting a removable power source to the band-shaped housing via an adapter may confer additional advantages to smart ring configurations with removable power sources. Adapters may be configured to interface a plurality of power source options with a plurality of housing options in a variety of geometries, as described below.

When attached to the smart ring, the removable power source may charge an internal power source of the smart ring. The internal power source may maintain the state (e.g., by preserving the state of volatile memory) or maintain some other functions of the smart ring (e.g., sensing), while the removable power source is being replaced. In some implementations, adding the removable power source may enable or trigger higher power functionality of the smart ring (e.g., wireless communications, displays, etc.). To that end, a sensor may be configured for detecting whether the removable power source is attached to the band-shaped housing.

Various techniques, systems, and methods for charging a power source of a smart ring using charging sources integrated into objects in the environment of the smart ring are discussed below with reference to FIG. 1, FIG. 2, FIG. 3, FIG. 4, FIG. 5A, FIG. 5B, FIG. 5C, and FIG. 5D. In section I, a smart ring that may include a removable power source is described with reference to FIG. 1. In section II, example smart ring form factor types and configurations that may accommodate a removable power source are discussed with reference to FIG. 2 and FIG. 3. In section III, an example operating environment in which a smart ring with the removable power source may operate is described with reference to FIG. 4. In section IV, example configurations of assembled smart rings with removable power sources as well as the constituent components are described with reference to FIG. 5A, FIG. 5B, FIG. 5C, and FIG. 5D. In section V, other considerations are described.

Examples of Smart Ring and Smart Ring Components

FIG. 1 illustrates a system 100 comprising a smart ring 101 that may include a removable power source attached to a band-shaped housing according to one or more of the techniques described herein. FIG. 1 also shows one or more devices or systems that may be electrically, mechanically, or communicatively connected to the smart ring 101. As shown, the smart ring 101 may include a set of components 102, which may have various power needs and may impact the rate at which the smart ring 101 consumes electrical energy. Some of the components 102 may be disposed at the band-shaped housing, as described below, and interact with the components disposed at the removable charging source of the smart ring 101 or outside of the smart ring 101 altogether. Furthermore, in implementations where the smart ring 101 uses wireless transfer of electromagnetic energy between the removable power source and the internal power source of the smart ring, the components 102 may be configured to be compatible with the electromagnetic fields to which the components 102 may be exposed during the wireless power transfer.

The system 100 may comprise any one or more of: a charger 103 for the smart ring 101, a user device 104, a network 105, a mobile device 106, or a server 107. The charger 103 may provide energy to the smart ring 101 via a direct electrical, a wireless, or an optical connection. The smart ring 101 may be in a direct communicative connection with the user device 104, the mobile device 106, or the server 107 via the network 105. Interactions between the smart ring 101 and other components of the system 100 are discussed in more detail in the context of FIG. 4.

The smart ring 101 may sense a variety of signals indicative of activities of a user wearing the ring 101, biometric signals, a physiological state of the user, or signals indicative of the user's environment. The smart ring 101 may analyze the sensed signals using built-in computing capabilities or in cooperation with other computing devices (e.g., user device 104, mobile device 106, server 107) and provide feedback to the user or about the user via the smart ring 101 or other devices (e.g., user device 104, mobile device 106, server 107). Additionally or alternatively, the smart ring 101 may provide the user with notifications sent by other devices, enable secure access to locations or information, or a variety of other applications pertaining to health, wellness, productivity, or entertainment.

The smart ring 101, which may be referred to herein as the ring 101, may comprise a variety of mechanical, electrical, optical, or any other suitable subsystems, devices, components, or parts disposed within, at, throughout, or in mechanical connection to a housing 110 (which may be ring shaped and generally configured to be worn on a finger). Additionally, a set of interface components 112a and 112b may be disposed at the housing, and, in particular, through the surface of the housing. The interface components 112a and 112b may provide a physical access (e.g., electrical, fluidic, mechanical, or optical) to the components disposed within the housing. The interface components 112a and 112b may exemplify surface elements disposed at the housing. As discussed below, some of the surface elements of the housing may also be parts of the smart ring components.

As shown in FIG. 1, the components 102 of the smart ring 101 may be distributed within, throughout, or on the housing 110. As discussed in the contexts of FIG. 2 and FIG. 3 below, the housing 110 may be configured in a variety of ways and include multiple parts. The smart ring components 102 may, for example, be distributed among the different parts of the housing 110, as described below, and may include surface elements of the housing 110. The housing 110 may include mechanical, electrical, optical, or any other suitable subsystems, devices, components, or parts disposed within or in mechanical connection to the housing 110, including a battery 120, a charging unit 130, a controller 140, a sensor system 150 comprising one or more sensors, a communications unit 160, a one or more user input devices 170, or a one or more output devices 190. Each of the components 120, 130, 140, 150, 160, 170, and/or 190 may include one or more associated circuits, as well as packaging elements. The components 120, 130, 140, 150, 160, 170, and/or 190 may be electrically or communicatively connected with each other (e.g., via one or more busses or links, power lines, etc.), and may cooperate to enable "smart" functionality described within this disclosure.

The battery 120 may supply energy or power to the controller 140, the sensors 150, the communications unit 160, the user input devices 170, or the output devices 190. In some scenarios or implementations, the battery 120 may supply energy or power to the charging unit 130. The charging unit 130, may supply energy or power to the battery 120. In some implementations, the charging unit 130 may supply (e.g., from the charger 103, or harvested from other sources) energy or power to the controller 140, the sensors 150, the communications unit 160, the user input devices 170, or the output devices 190. In a charging mode of operation of the smart ring 101, the average power supplied by the charging unit 130 to the battery 120 may exceed the average power supplied by the battery 120 to the charging unit 130, resulting in a net transfer of energy from the charging unit 130 to the battery 120. In a non-charging mode of operation, the charging unit 130 may, on average, draw energy from the battery 120.

The battery 120 may include one or more cells that convert chemical, thermal, nuclear or another suitable form of energy into electrical energy to power other components or subsystems 140, 150, 160, 170, and/or 190 of the smart ring 101. The battery 120 may include one or more alkaline, lithium, lithium-ion and or other suitable cells. The battery 120 may include two terminals that, in operation, maintain a substantially fixed voltage of 1.5, 3, 4.5, 6, 9, 12 V or any other suitable terminal voltage between them. When fully charged, the battery 120 may be capable of delivering to power-sinking components an amount of charge, referred to herein as "full charge," without recharging. The full charge of the battery may be 1, 2, 5, 10, 20, 50, 100, 200, 500, 1000, 2000, 5000 mAh or any other suitable charge that can be delivered to one or more power-consuming loads as electrical current.

The battery 120 may include a charge-storage device, such as, for example a capacitor or a super-capacitor. In some implementations discussed below, the battery 120 may be entirely composed of one or more capacitive or charge-storage elements. The charge storage device may be capable of delivering higher currents than the energy-conversion cells included in the battery 120. Furthermore, the charge storage device may maintain voltage available to the components or subsystems 130, 140, 150, 160, 170, and/or 190 when one or more cells of the battery 120 are removed to be subsequently replaced by other cells.

The charging unit 130 may be configured to replenish the charge supplied by the battery 120 to power-sinking components or subsystems (e.g., one or more of subsystems 130, 140, 150, 160, 170, and/or 190) or, more specifically, by their associated circuits. To replenish the battery charge, the charging unit 130 may convert one form of electrical energy into another form of electrical energy. More specifically, the charging unit 130 may convert alternating current (AC) to direct current (DC), may perform frequency conversions of current or voltage waveforms, or may convert energy stored in static electric fields or static magnetic fields into direct current. Additionally or alternatively, the charging unit 130 may harvest energy from radiating or evanescent electromagnetic fields (including optical radiation) and convert it into the charge stored in the battery 120. Furthermore, the charging unit 130 may convert non-electrical energy into electrical energy. For example, the charging unit 130 may harvest energy from motion, or from thermal gradients.

The controller 140 may include a processor unit 142 and a memory unit 144. The processor unit 142 may include one or more processors, such as a microprocessor (μP), a digital signal processor (DSP), a central processing unit (CPU), a graphical processing unit (GPU), a field-programmable gate array (FPGA), an application-specific integrated circuit (ASIC), or any other suitable electronic processing components. Additionally or alternatively, the processor unit 142 may include photonic processing components.

The memory unit 144 may include one or more computer memory devices or components, such as one or more registers, RAM, ROM, EEPROM, or on-board flash memory. The memory unit 144 may use magnetic, optical, electronic, spintronic, or any other suitable storage technology. In some implementations, at least some of the functionality the memory unit 144 may be integrated in an ASIC or and FPGA. Furthermore, the memory unit 144 may be integrated into the same chip as the processor unit 142 and the chip, in some implementations, may be an ASIC or an FPGA.

The memory unit 144 may store a smart ring (SR) routine 146 with a set of instructions, that, when executed by the processor 142 may enable the operation and the functionality described in more detail below. Furthermore, the memory unit 144 may store smart ring (SR) data 148, which may include (i) input data used by one or more of the components 102 (e.g., by the controller when implementing the SR routine 146) or (ii) output data generated by one or more of the components 102 (e.g., the controller 140, the sensor unit 150, the communication unit 160, or the user input unit 170). In some implementations, other units, components, or devices may generate data (e.g., diagnostic data) for storing in the memory unit 144.

The processing unit 142 may draw power from the battery 120 (or directly from the charging unit 130) to read from the memory unit 144 and to execute instructions contained in the smart ring routine 146. Likewise, the memory unit 144 may draw power from the battery 120 (or directly from the charging unit 130) to maintain the stored data or to enable reading or writing data into the memory unit 144. The processor unit 142, the memory unit 144, or the controller 140 as a whole may be capable of operating in one or more low-power mode. One such low power mode may maintain the machine state of the controller 140 when less than a threshold power is available from the battery 120 or during a charging operation in which one or more battery cells are exchanged.

The controller 140 may receive and process data from the sensors 150, the communications unit 160, or the user input devices 170. The controller 140 may perform computations to generate new data, signals, or information. The controller 140 may send data from the memory unit 144 or the generated data to the communication unit 160 or the output devices 190. The electrical signals or waveforms generated by the controller 140 may include digital or analog signals or waveforms. The controller 140 may include electrical or electronic circuits for detecting, transforming (e.g., linearly or non-linearly filtering, amplifying, attenuating), or converting (e.g., digital to analog, analog to digital, rectifying, changing frequency) of analog or digital electrical signals or waveforms.

The sensor unit 150 may include one or more sensors disposed within or throughout the housing 110 of the ring 101. Each of the one or more sensors may transduce one or more of: light, sound, acceleration, translational or rotational movement, strain, temperature, chemical composition, surface conductivity or other suitable signals into electrical or electronic sensors or signals. A sensor may be acoustic, photonic, micro-electro-mechanical systems (MEMS) sensors, chemical, micro-fluidic (e.g., flow sensor), or any other suitable type of sensor. The sensor unit 150 may include, for example, an inertial motion unit (IMU) for detecting orientation and movement of the ring 101.

The communication unit 160 may facilitate wired or wireless communication between the ring 101 and one or more other devices. The communication unit 160 may include, for example, a network adapter to connect to a computer network, and, via the network, to network-connected devices. The computer network may be the Internet or another type of suitable network (e.g., a personal area network (PAN), a local area network (LAN), a metropolitan area network (MAN), a wide area network (WAN), a mobile, a wired or wireless network, a private network, a virtual private network, etc.).

The communication unit 160 may use one or more wireless protocols, standards, or technologies for communication, such as Wi-Fi, near field communication (NFC), Bluetooth, or Bluetooth low energy (BLE). Additionally or alternatively, the communication unit 160 may enable free-space optical or acoustic links. In some implementations, the communication unit 160 may include one or more ports for a wired communication connections. The wired connections used by the wireless communication module 160 may include electrical or optical connections (e.g., fiberoptic, twisted-pair, coaxial cable).

User input unit 170 may collect information from a person wearing the ring 101 or another user, capable of interacting with the ring 101. In some implementations, one or more of the sensors in the sensor unit 150 may act as user input devices within the user input unit 170. User input devices may transduce tactile, acoustic, video, gesture, or any other suitable user input into digital or analog electrical signal, and send these electrical signals to the controller 140.

The output unit 190 may include one or more devices to output information to a user of the ring 101. The one or more output devices may include acoustic devices (e.g., speaker, ultrasonic); haptic (thermal, electrical) devices; electronic displays for optical output, such as an organic light emitting device (OLED) display, a laser unit, a high-power light-emitting device (LED), etc.; or any other suitable types of devices. For example, the output unit 190 may include a projector that projects an image onto a suitable surface. In some implementations, the sensor unit 150, the user input unit 170, and the output unit 190 may cooperate to create a user interface with capabilities (e.g., a keyboard) of much larger computer systems, as described in more detail below.

The components 120, 130, 140, 150, 160, 170, and/or 190 may be interconnected by a bus 195, which may be implemented using one or more circuit board traces, wires, or other electrical, optoelectronic, or optical connections. The bus 195 may be a collection of electrical power or communicative interconnections. The communicative interconnections may be configured to carry signals that conform to any one or more of a variety of protocols, such as I2C, SPI, or other logic to enable cooperation of the various components.

Example Smart Ring Form Factor Types

Figure 2:
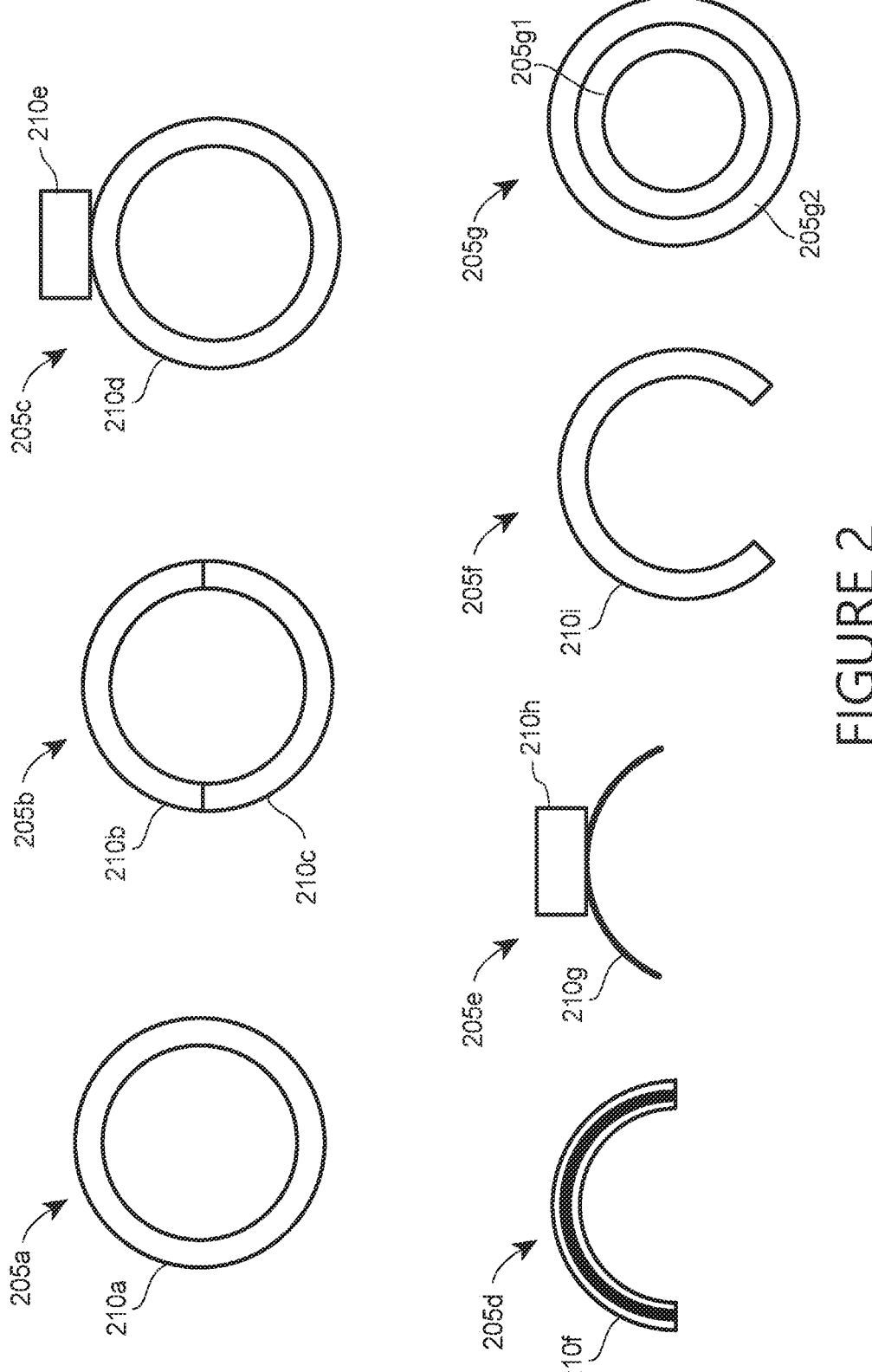
FIG. 2 illustrates a number of different form factor types of a smart ring according to some embodiments.

FIG. 2 includes block diagrams of a number of different example form factor types or configurations 205*a*, 205*b*, 205*c*, 205*d*, 205*e*, and/or 205*f* of a smart ring (e.g., the smart ring 101). The variety of configurations of the ring-shaped housing may influence, or, conversely, depend on the technique for attaching a removable power source. Furthermore, the configurations 205a, 205b, 205c, 205d, 205e, and/or 205f may depend on or determine the types of indicators or communication components disposed at the ring.

The configurations 205a, 205b, 205c, 205d, 205e, and/or 205f (which may also be referred to as the smart rings 205a, 205b, 205c, 205d, 205e, and/or 205f) may each represent an implementation of the smart ring 101, and each may include any one or more of the components 102 (or components similar to the components 102). In some embodiments, one or more of the components 102 may not be included in the configurations 205a, 205b, 205c, 205d, 205e, and/or 205f. The configurations 205a, 205b, 205c, 205d, 205e, and/or 205f include housings 210a-f, which may be similar to the housing 110 shown in FIG. 1.

The configuration 205a may be referred to as a band-only configuration comprising a housing 210a. In the configuration 205b, a band may include two or more removably connected parts, such as the housing parts 210b and 210c. The two housing parts 210b and 210c may each house at least some of the components 102, distributed between the housing parks 210b and 210c in any suitable manner.

The configuration 205c may be referred to as a band-and-platform configuration comprising (i) a housing component 210d and (ii) a housing component 210e (sometimes called the "platform 210e"), which may be in a fixed or removable mechanical connection with the housing 210d. The platform 210e may function as a mount for a "jewel" or for any other suitable attachment. The housing component 210d and the platform 210e may each house at least one or more of the components 102 (or similar components).

In some instances, the term "smart ring" may refer to a partial ring that houses one or more components (e.g., components 102) that enable the smart ring functionality described herein. The configurations 205d and 205e may be characterized as "partial" smart rings, and may be configured for attachment to a second ring. The second ring may be a conventional ring without smart functionality, or may be second smart ring, wherein some smart functionality of the first or second rings may be enhanced by the attachment.

The configuration 205d, for example, may include a housing 210f with a groove to enable clipping onto a conventional ring. The grooved clip-on housing 210f may house the smart ring components described above. The configuration 205e may clip onto a conventional ring using a substantially flat clip 210g part of the housing and contain the smart ring components in a platform 210h part of the housing.

The configuration 205f, on the other hand, may be configured to be capable of being mounted onto a finger of a user without additional support (e.g., another ring). To that end, the housing 210i of the configuration 205f may be substantially of a partial annular shape subtending between 180 and 360 degrees of a full circumference. When implemented as a partial annular shape, the housing 210i may be more adaptable to fingers of different sizes than a fully annular band (360 degrees), and may be elastic. A restorative force produced by a deformation of the housing 210i may ensure a suitable physical contact with the finger. Additional suitable combinations of configurations (not illustrated) may combine at least some of the housing features discussed above.

The configuration 205g may be configured to have two rings, a first ring 205g1 capable of and adapted to be mounted onto a finger of a user, and a second ring 205g2 capable of and adapted to be directly mounted onto the first ring 205g1, as depicted in FIG. 2. Said another way, the first ring 205g1 and the second ring 205g2 are arranged in a concentric circle arrangement, such that the second ring 205g2 does not contact a user's finger when the smart ring 205g is worn. Rather, only the first ring 205g1 contacts the user's finger. Additional suitable combinations of configurations (not illustrated) may combine at least some of the housing features discussed above.

Figure 3:
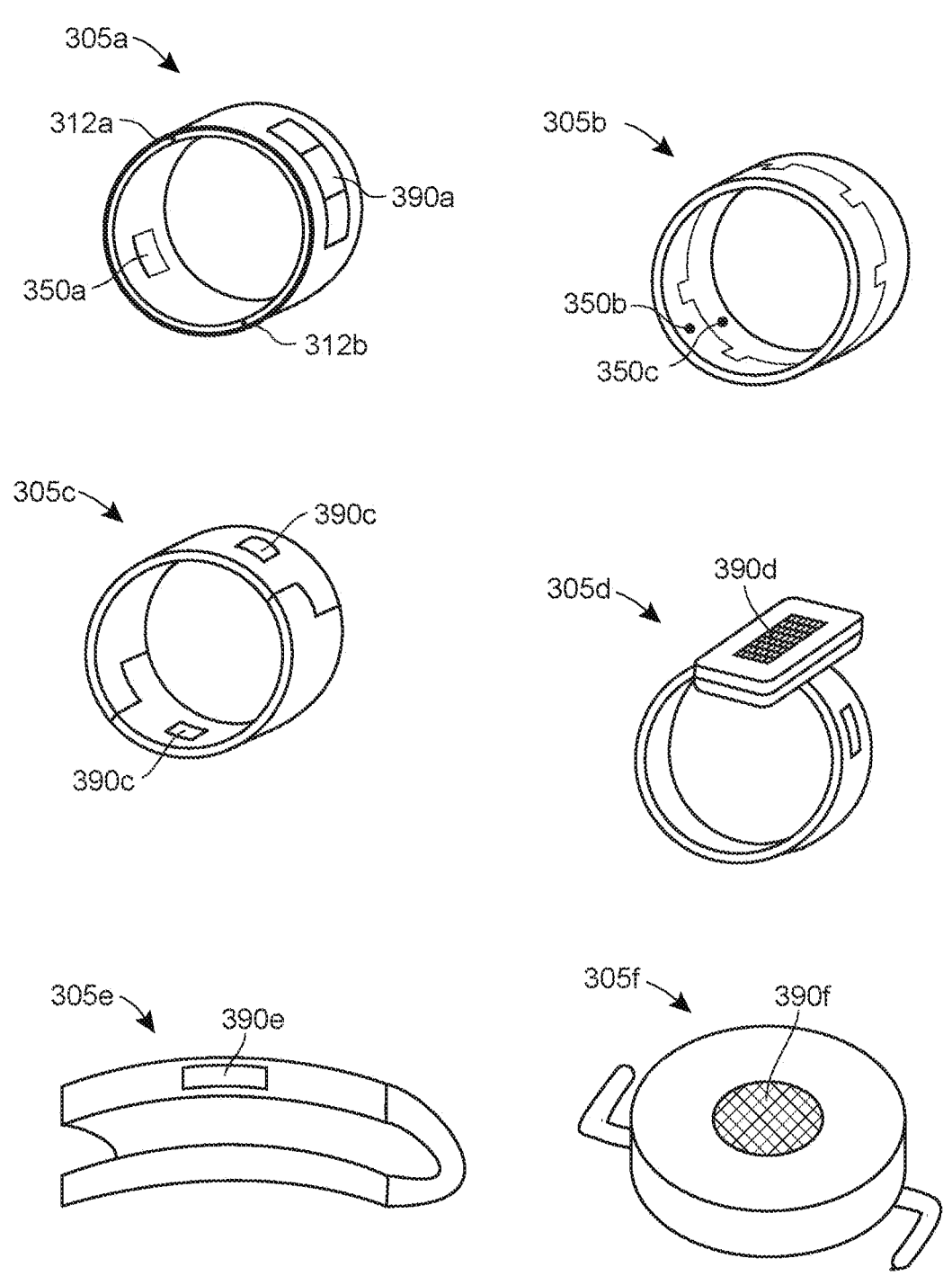
FIG. 3 illustrates examples of different smart ring form factors.

FIG. 3 includes perspective views of example configurations 305a, 305b, 305c, 305d, 305e, and/or 305f of a smart ring (e.g., the smart ring 101) in which a number of surface elements are included.

Configuration 305a is an example band configuration 205a of a smart ring (e.g., smart ring 101). Some of the surface elements of the housing may include interfaces 312a, 312b that may be electrically connected to, for example, the charging unit 130 or the communications unit 160. On the outside of the configuration 305a, the interfaces 312a, 312b may be electrically or optically connected with a charger to transfer energy from the charger to a battery (e.g., the battery 120), or with another device to transfer data to or from the ring 305a. The outer surface of the configuration 305a may include a display 390a, while the inner surface may include a biometric sensor 350a.

The configurations 305b and 305c are examples of configurations of a smart ring with multiple housing parts (e.g., configuration 205b in FIG. 2). Two (or more) parts may be separate axially (configuration 305b), azimuthally (configuration 305c), or radially (nested rings, not shown). The parts may be connected mechanically, electrically, or optically via, for example, interfaces analogous to interfaces 312a, 312b in configuration 305a. Each part of a smart ring housing may have one or more surface elements, such as, for example, sensors 350b, 350c or output elements 390b, 390c. The latter may be LEDs (e.g., output element 390b) or haptic feedback devices (e.g., output element 390c), among other suitable sensor or output devices. Additionally or alternatively, at least some of the surface elements (e.g., microphones, touch sensors) may belong to the user input unit 170.

Configuration 305d may be an example of a band and platform configuration (e.g., configuration 205c), while configurations 305e and 305f may be examples of the partial ring configurations 205d and 205e, respectively. Output devices 390d, 390e, and/or 390f on the corresponding configurations 305d, 305e, and/or 305f may be LCD display, OLED displays, e-ink displays, one or more LED pixels, speakers, or any other suitable output devices that may be a part of a suite of outputs represented by an output unit (e.g., output unit 190). Other surface elements, such as an interface component 312c may be disposed within, at, or through the housing. It should be appreciated that a variety of suitable surface elements may be disposed at the illustrated configurations 305a, 305b, 305c, 305d, 305e, and/or 305f at largely interchangeable locations. For example, the output elements 390d, 390e, and/or 390f may be replaced with sensors (e.g., UV sensor, ambient light or noise sensors, etc.), user input devices (e.g., buttons, microphones, etc.), interfaces (e.g., including patch antennas or optoelectronic components communicatively connected to communications units), or other suitable surface elements.

Example Operating Environment for a Smart Ring

Figure 4:
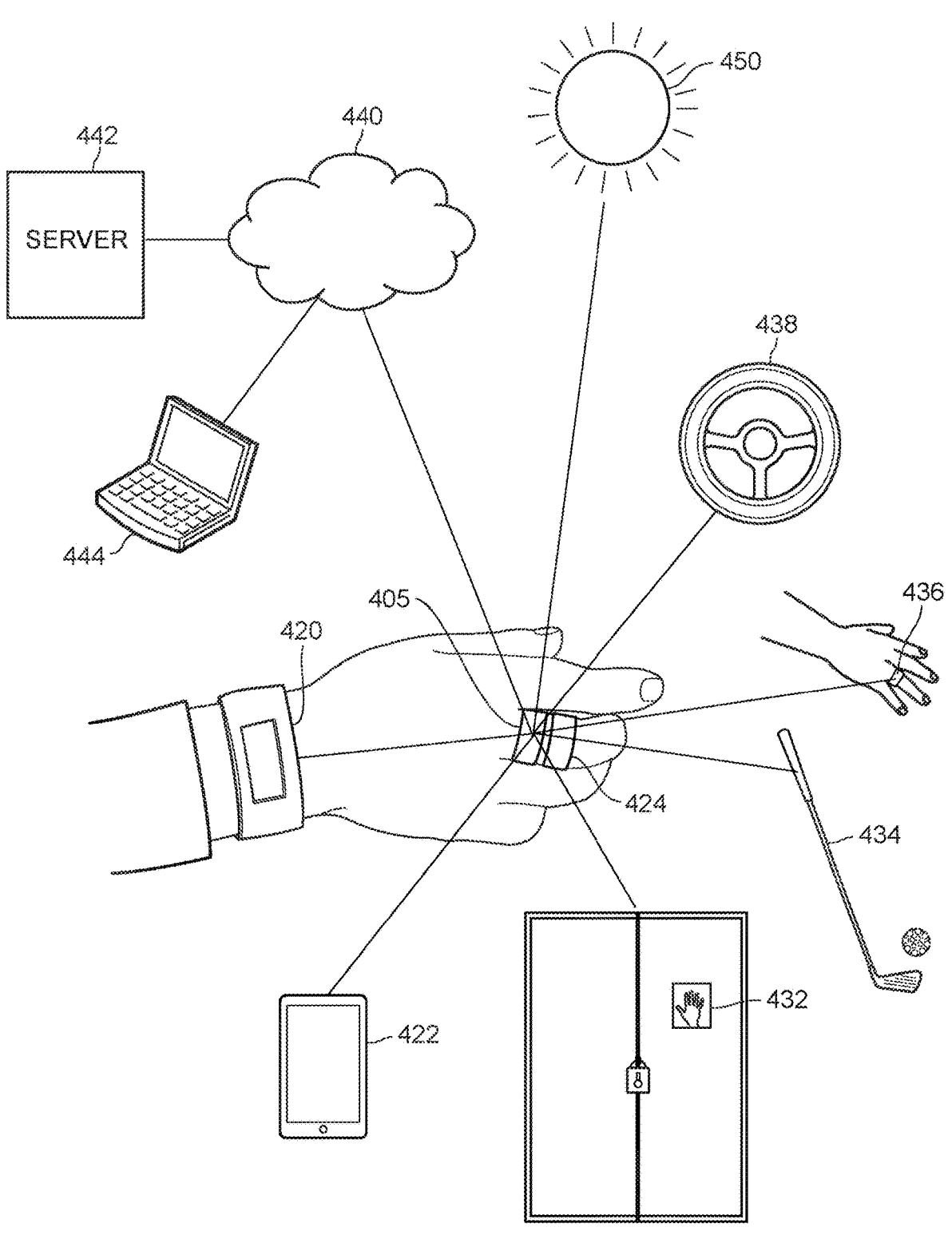
FIG. 4 illustrates an environment within which a smart ring may operate according to some embodiments.

FIG. 4 illustrates an example environment 400 within which a smart ring 405 with a removable power source may be configured to operate. In an embodiment, the smart ring 405 may be the smart ring 101. In some embodiments, the smart ring 405 may be any suitable smart ring capable of providing at least some of the functionality described herein. Depending on the embodiment, the smart ring 405 may be configured in a manner similar or equivalent to any of the configurations 205a, 205b, 205c, 205d, 205e, and/or 205f or 305a, 305b, 305c, 305d, 305e, and/or 305f shown in FIG. 2 and FIG. 3.

The smart ring 405 may interact (e.g., by sensing, sending data, receiving data, receiving energy) with a variety of devices, such as bracelet 420 or another suitable wearable device, a mobile device 422 (e.g., a smart phone, a tablet, etc.) that may be, for example, the user device 104, another ring 424 (e.g., another smart ring, a charger for the smart ring 405, etc.), a secure access panel 432, a golf club 434 (or another recreational accessory), a smart ring 436 worn by another user, or a steering wheel 438 (or another vehicle interface). Additionally or alternatively, the smart ring 405 may be communicatively connected to a network 440 (e.g., WiFi, 5G cellular), and via the network 440 (e.g., network 105 in FIG. 1) to a server 442 (e.g., server 107 in FIG. 1) or a personal computer 444 (e.g., mobile device 106). Additionally or alternatively, the ring 405 may be configured to sense or harvest energy from natural environment, such as the sun 450.

The ring 405 may exchange data with other devices by communicatively connecting to the other devices using, for example, the communication unit 160. The communicative connection to other device may be initiated by the ring 405 in response to user input via the user input unit 170, in response to detecting trigger conditions using the sensor unit 150, or may be initiated by the other devices. The communicative connection may be wireless, wired electrical connection, or optical. In some implementation, establishing a communicative link may include establishing a mechanical connection.

The ring 405 may connect to other devices (e.g., a device with the charger 103 built in) to charge the battery 120. The connection to other devices for charging may enable the ring 405 to be recharged without the need for removing the ring 405 from the finger. For example, the bracelet 420 may include an energy source that may transfer the energy from the energy source to battery 120 of the ring 405 via the charging unit 430. To that end, an electrical (or optical) cable may extend from the bracelet 420 to an interface (e.g., interfaces 112a, 112b, 312a, 312b) disposed at the housing (e.g., housings 110, 210a, 210b, 210c, 210d, 210e, 210f, 210g, 210h, and/or 210i) of the ring 405. The mobile device 422, the ring 424, the golf club 434, the steering wheel 438 may also include energy source configured as chargers (e.g., the charger 103) for the ring 405. The chargers for may transfer energy to the ring 405 via a wired or wireless (e.g., inductive coupling) connection with the charging unit 130 of the ring 405.

Configurations of Smart Rings with Removable Power Sources

Adding a removable external power source to a smart ring may confer a number of advantages in comparison to a smart ring with only a build-in power source. A rechargeable removable power source may be removed from the smart ring for charging, while the smart ring maintains a level of operation while remaining on a finger of a user. To maintain operation, the smart ring may include a small built-in power source. The energy storage and power capacity of the built-in power source may vary depending on implementation. In some implementations, when the removable power source is removed, it may be replaced by another fully charged removable power source in a few seconds, for example. A removable power source may be larger than an internal power source that can be placed within a band-shaped housing of the smart ring, and, consequently may store significantly more charge than an internal power source. Thus, the larger external power source may enable more applications for the smart ring. Still furthermore, the removable external power sources may be available in a variety of form factors that may be exchanged by a user according to their preference between bulk and capacity. Generally, removable power sources may enable flexible use of the smart ring while offering multiple aesthetic and comfort choices.

To connect to a housing of the smart ring, a removable power source may connect to an adapter. For the purpose of discussion here, the adapter may be any component that facilitates a removable attachment between the housing and the removable power source. The adapter may be configured to include other functionality, such as facilitating electrical or communicative connections, for example. Generally, the adapter may be fixedly attached to the housing or to the removable power source. A combination of adapters may be distributed between the housing and the power source. On the other hand, the adapter may be a distinct component, configured to removably attach to the housing and the removable power source.

The adapter that is removable from the band-shaped housing and from the removable power source may have a number of advantages. For example, removable adapters may be configured to attach a smart ring housing to one of a selection of removable power sources. Conversely, removable adapters may be configured to attach a removable power source to one of a selection of housings. Furthermore, design elements may be included in an adapter, offering aesthetic choices to a user. Still furthermore, repetitive removal of the removable power source may impose a certain amount of wear on the adapter. It may be advantageous to periodically replace the adapter without replacing either the smart ring or the removable power source.

FIG. 5A, FIG. 5B, FIG. 5C, and FIG. 5D illustrate assembled configurations 505a, 505b, and/or 505c (in FIG. 5B and FIG. 5D) and corresponding constituent components (in FIG. 5A and FIG. 5C) of smart rings that include a band-shaped housing 510 and removable external power sources 520a, 520b, and/or 520c (that may also be referred to, for conciseness, as external power sources or removable power sources). The band-shaped housing 510 may have an outer surface 512, an inner surface 513, and two side surfaces 514. Though the surfaces 512, 514 may blend into one another, the outer surface 512 may refer to a portion of the housing surface that is substantially opposite to another portion of the housing surface that is configured to be in contact with a finger of a user. In the configurations 505a, 505b, and/or 505c, the removable power sources 520a, 520b, and/or 520c are configured to be disposed at the outer surface 512 of the band-shaped housing 510 with the aid of adapters 580a, 580b, and/or 580c, as described below.

The band-shaped housing 510 may be the, for example, the housing 110 of the ring 101 in FIG. 1. The housing 510 may include any of the components 102 that enable smart ring functionality as described above. Furthermore, the band-shaped housing 510 may be configured similarly to configurations 205a, 205b, 205c, 205d, 205e, 205f, and/or 205g in FIG. 2. In so far as the configurations 205d, 205e, and/or 205f do not for a complete band, the band-shaped housing 510 may be formed by a combination of a ring with any of the partial-ring configurations 205d, 205e, and/or 205f. In so far as the configurations 205c and 205e already include housing components 210e and 210h disposed as platforms at band-shaped housing components, the removable power sources 520a, 520b, and/or 520c may be disposed at the band-shaped housing 510 instead of or in addition to the housing components 210e and 210h.

The housing 510 includes an internal power source. The internal power source may be a battery (e.g., the battery 120), a capacitor, or a suitable combination of the two. In some implementations, the internal power source may include a generator, configured, for example, to harvest energy from environmental energy sources (e.g., light, movement, temperature gradients). The internal power source may be configured for recharging from the external power sources 520a, 520b, and/or 520c, or from an array of other charging sources or chargers. Some chargers may be wall-plug chargers, some chargers may be environmentally integrated chargers (e.g., built into the steering wheel 438, the golf club 434 of the environment 400) or wearable chargers (e.g., the bracelet 420, a charging glove, etc.). To recharge the internal power source, a charging unit (e.g., the charging unit 130) may be disposed within the housing 510. The charging unit may enable wired charging of the internal power source via an electrical connection. Additionally or alternatively, the charging unit may enable wireless charging. The charging unit configured for wireless charging may include an induction coil connected to rectification components to enable charging by electromagnetic induction. The charging unit disposed within the band-shaped housing 510 may facilitate charging the internal power source from the external power source 520a, 520b, and/or 520c.

Another component disposed within the band-shaped housing 510 may be configured to enable smart-ring functionality (e.g., as described in the discussion of FIG. 1) while drawing power (equivalently: charge, current, or energy) from the internal power source. For example, the component may be a sensor configured to sense a physical phenomenon external to the band-shaped housing 510, an electronic communication interface disposed within the band-shaped housing 510 or a user interface disposed in, at, or throughout the band-shaped housing 510. Furthermore, a controller (e.g., the controller 140) may be disposed within the band-shaped housing and configured to draw power from the internal power source. In some implementations, any of the components disposed within the band-shaped housing 510 that need power may be configured to draw power from one of the external removable power sources 520a, 520b, and/or 520c that is disposed at the housing 510.

One of the components disposed within the band-shaped housing 510 may be a power detection sensor configured to detect a presence of a removable power source (e.g., one of 520a, 520b, and/or 520c). The power detection sensor may be included in the sensors 150 of the smart ring 101, for example. The power detection sensor may be a current sensor, a voltage sensor, a capacitance sensor, a magnetic sensor, an optical sensor or any other suitable sensor. The smart ring may be configured to operate in one of a plurality of power modes and switch between power modes based at least in part upon detecting the presence (or lack thereof) of the removable power source.

The band-shaped housing 510 may include an electrical interface 516, configured to cooperate with any one of the adapters 580a, 580b, and/or 580c in forming an electrical connection with corresponding one or more of the removable power sources 520a, 520b, and/or 520c. Thus formed electrical connections are discussed in more detail below.

The removable power sources 520a, 520b, and/or 520c may be configured to removably attach to the band-shaped housing 510 (e.g., via the adapters 580a, 580b, and/or 580c) to provide power or energy to the components disposed within or at the band-shaped housing 510. In some implementations, the removable power sources 520a, 520b, and/or 520c may provide energy only via recharging the internal power source disposed within the band-shaped housing 510. In other implementations, the removable power sources 520a, 520b, and/or 520c may provide the energy directly to at least some of the components (in addition to the internal power source) disposed within the housing 510. In either case, the external power sources may provide, on one charge, substantially more energy to the components disposed within the band-shaped housing 510 than what is available in a fully-charged internal power source. For example, a removable power source (e.g., one of the removable power sources 520a, 520b, and/or 520c) may have a capacity to store 10, 100, 1000, 10000 times or more energy than the internal power source.

Any of the removable power sources 520a, 520b, and/or 520c may include one or more cells that convert chemical, thermal, nuclear or another suitable form of energy into electrical energy. The cells in the power sources 520a, 520b, and/or 520c may include one or more alkaline, nickel-cadmium, nickel-metal-hydride, lithium, lithium-ion, lithium polymer or other suitable cells. The removable power sources 520a, 520b, and/or 520c may each include two terminals that, in operation, maintain a substantially fixed voltage of 1.5, 3, 4.5, 6, 9, 12 V or any other suitable terminal voltage between them. When fully charged, the removable power sources 520a, 520b, and/or 520c may each be capable of delivering an amount of charge, referred to herein as "full charge," without recharging. The full charge of one of the removable power sources 520a, 520b, and/or 520c may be 10, 20, 50, 100, 200, 500, 1000, 2000, 5000 mAh or any other suitable charge.

Any one of the removable power sources 520a, 520b, and/or 520c may be configured to transfer energy wirelessly to the internal power source of within the band-shaped housing 510 by way, for example, of the charging unit 130. To that end any one of the removable power sources 520a, 520b, and/or 520c may include a power transmitter. For example, the power transmitter may include a radio-frequency oscillator connected to a transmitting induction coil for transferring energy to a receiving induction coil disposed within the band-shaped housing 510. In other implementations, the power transmitter may include a laser diode for transferring energy to a photovoltaic element disposed within the band-shaped housing 510.

In some implementations, any one of the removable power sources 520a, 520b, and/or 520c may include a housing configured to hold one or more battery cells. The housing may include conductive elements to facilitate an electrical connection between the battery cells and the internal power source, e.g. via one of the adapters 580a, 580b, and/or 580c. The removable power sources 520a, 520b, and/or 520c may additionally include (e.g., disposed at a housing) elements for harvesting energy from the environment (e.g., photovoltaic cells, thermoelectric generators, piezoelectric generators, etc.). The harvesting elements may recharge the battery cells within the housing. The housing may additionally include elements for harvesting energy from the environment (e.g., photovoltaic cells, thermoelectric generators, piezoelectric generators, etc.) to recharge the battery cells within the housing. Additionally or alternatively, the housing may include elements for a wireless energy transfer (wireless charging) to the internal power source. Furthermore, the housing of any one of the removable power sources 520a, 520b, and/or 520c may include fixed or reconfigurable aesthetic elements.

Generally, external power sources 520a, 520b, and/or 520c may include additional functionality beyond providing energy to the internal power source or other components disposed within the band-shaped housing 510. One or more sensors, user interface components, memory storage devices, etc., may be disposed within the housing of any of the removable power sources 520a, 520b, and/or 520c. The housing may also include a communication interface (wired or wireless) between the components disposed within the removable power source housing and the components disposed within the band-shaped housing 510. In some implementations, the communication interface may be configured via a corresponding one of the adapters 580a, 580b, and/or 580c.

The adapters 580a, 580b, and/or 580c may include mechanical interfaces 582a, 582b, and/or 582c to the housing 510, mechanical interfaces 584a, 584b, and/or 584c to removable power sources 520a, 520b, and/or 520c, and electrical interfaces 586a, 586b, and/or 586c to facilitate electrical connections between the removable power sources 520a, 520b, and/or 520c and an internal power source disposed within the band-shaped housing 510. In some implementations, the housing mechanical interfaces 582a, 582b, and/or 582c and the power source mechanical interfaces 584a, 584b, and/or 584c may be made from the same material (e.g., metal, plastic, elastomer, etc.). For example, the adapters 580a, 580b, and/or 580c may be manufactured as substantially monolithic components including the mechanical interfaces 582a, 582b, and/or 582c, 584a, 584b, and/or 584c, with the electrical interfaces 586a, 586b, and/or 586c added in a separate manufacturing step. In other implementations, the housing interface material may be different from the power source interface material.

The housing mechanical interfaces 582a, 582b, and/or 582c may be configured for a friction fit with the housing 510. In other implementations, the housing mechanical interfaces 582a, 582b, and/or 582c may include a clipping mechanism, a set screw, a magnet, or any other suitable method for removably attaching to the housing 510. Still in other implementations, the adapters 580a, 580b, and/or 580c may be fixedly attached to the housing 510 via an adhesive or a solder, for example. To facilitate attachment to the housing 510, the housing mechanical interfaces 582a, 582b, and/or 582c may include surfaces shaped to conform to the outer surface 512 or side surfaces 514 of the housing 510.

The power source mechanical interfaces 584a, and 584b may be configured for a friction fit with the external power source 520a and 520b or may comprise a clipping mechanism. Additional mechanical features may facilitate connections. For example, the external power source 520b may include a groove 521 to mate with the interface 584a or the interface 584b. In another example, the external power source 520c may include a groove or a thread 521c that may be threaded onto a corresponding thread 585 in the interface 584c. Additionally or alternatively, the power source interfaces 584a, 584b, and/or 584c may include magnets, springs, or other suitable mechanisms to facilitate secure attachment and convenient removal of the removable power sources 520a, 520b, and/or 520c to the adapters 580a, 580b, and/or 580c.

The electrical interfaces 586a, 586b, and/or 586c of the adapters 580a, 580b, and/or 580c may include coaxial or two-pin male-male, female-male, or female-female adapters. The interfaces 586a, 586b, and/or 586c may provide two-contact connections between plugs or sockets disposed at the removable power sources 520a, 520b, and/or 520c and a corresponding plug or socket disposed at the interface 516 of the band-shaped housing 510. In some implementations, mechanical interfaces 582a, 582b, and/or 582c and 584a, 584b, and/or 584c may provide, at least partially, electrical connections between corresponding removable power sources 580a, 580b, and/or 580c and, for example, a charging unit disposed within the band-shaped housing 510. Such electrical connections may include one or more conductive paths via one or more of the surfaces 512, 514 of the band-shaped housing 510. For example, the housing 510 may serve as a ground connection for the electronics disposed within. The electrical interface 516 may then include a single contact, isolated from the ground connection and configured to connect via one of the electrical interfaces 586a, 586b, and/or 586c of the corresponding adapter 580a, 580b, and/or 580c to a corresponding contact at one of the removable power sources 520a, 520b, and/or 520c.

To add to the discussion on interfaces (e.g., 582a, 582b, and/or 582c, 584a, 584b, and/or 584c, 586a, 586b, and/or 586c), a mechanical interface (e.g., 582a, 582b, and/or 582c) with the band-shaped housing 510 may be different from a mechanical interface (e.g., 584a, 584b, and/or 584c) with a removable power source (e.g., 520a, 520b, and/or 520c). The mechanical interfaces may include snap interfaces and friction fit interfaces with a variety of materials, magnetically-facilitated attachments, threads, set screws, or spring-loaded connectors. As an example of the latter, pogo-pins may be included at an adapter (e.g., 580a, 580b, and/or 580c). The pogo pins may get depressed when pushed against the band-shaped housing 510 until reaching indentations at which the pogo pins may engage with an interface at the band-shaped housing 510. In this manner, the pogo pins made of a conductive material may facilitate both, mechanical and electrical connections. Additionally or alternatively, elastomeric connectors, made with alternately conductive and electrically insulating elastomer regions, may likewise facilitate both, mechanical and electrical connections. Pogo pins, elastomeric connectors, or other suitable interfaces may likewise be used to connect, mechanically and electrically, with a removable power source (e.g., 520a, 520b, and/or 520c).

Figure 5A:
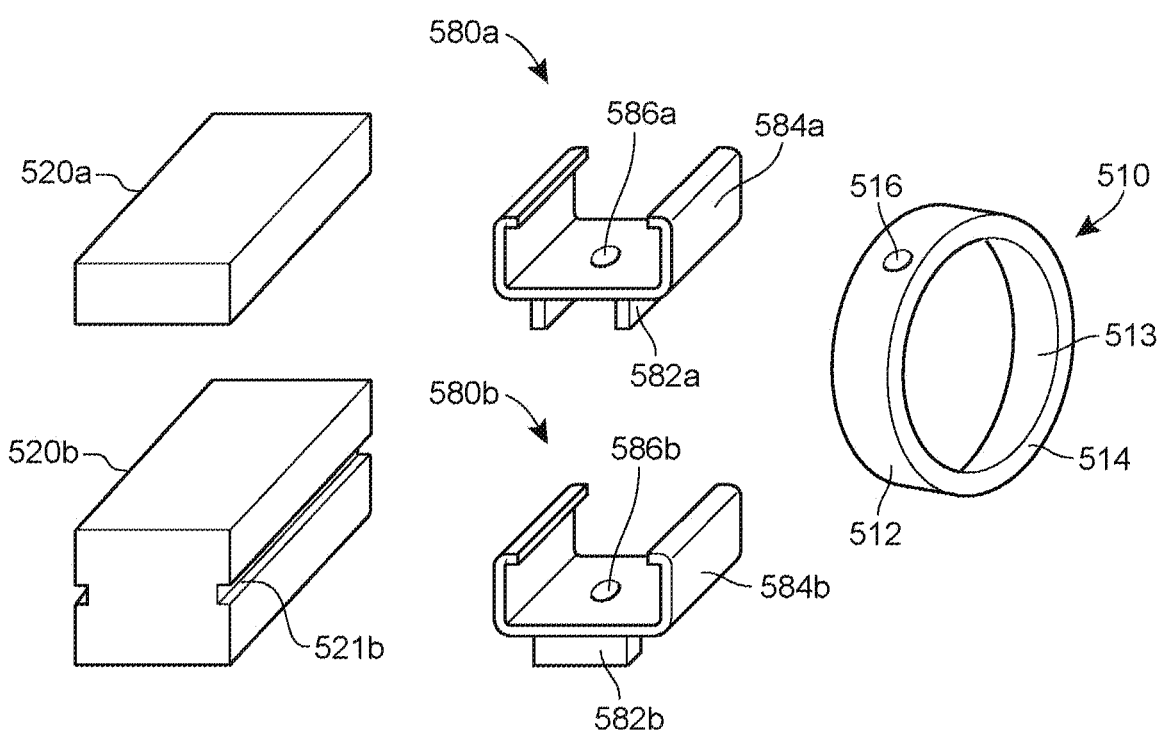
FIG. 5A, FIG. 5B, FIG. 5C, and FIG. 5D illustrate assembled configurations (in FIG. 5B and FIG. 5D) and corresponding constituent components (in FIG. 5A and FIG. 5C) of smart rings that include removable power sources according to some embodiments.
Figure 5B:
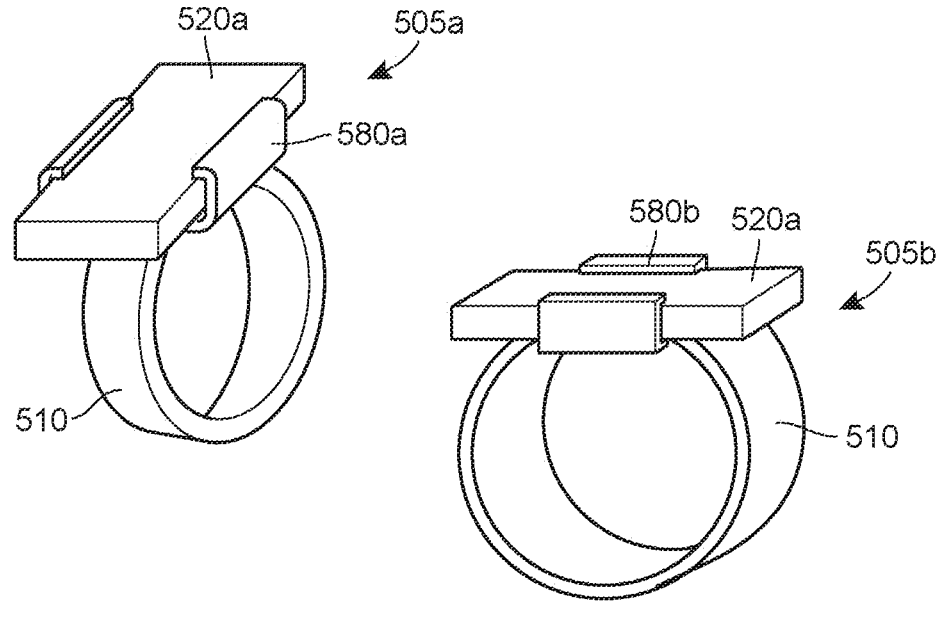
Figure 5C:
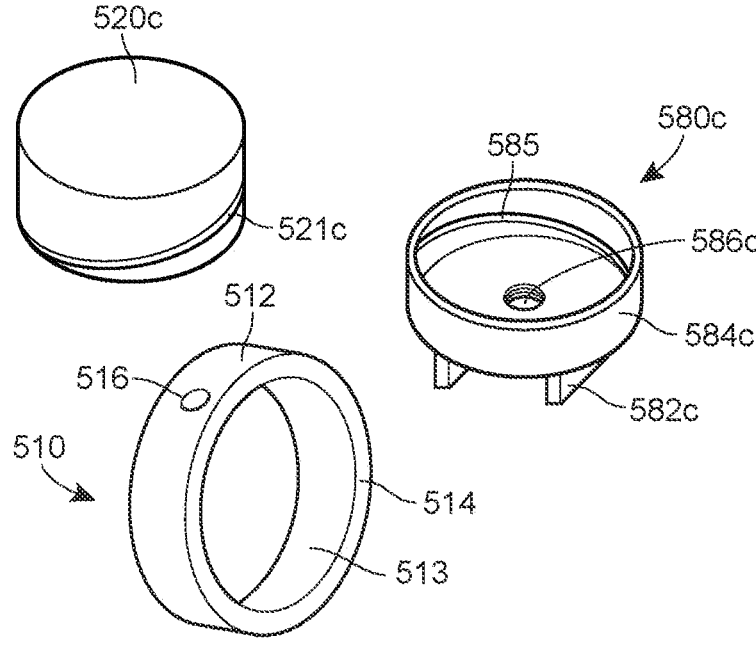
Figure 5D:
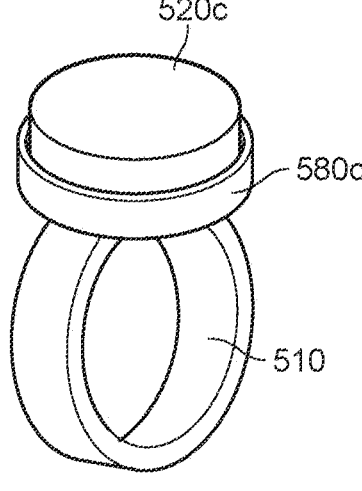

FIG. 5B illustrates two smart ring configurations 505a and 505b including the housing 510 and the removable power source 520a. Adapter 580a in configuration 505a leads to a different configuration geometry than adapter 580b in the configuration 505b. Using the removable power source 520b in lieu of the removable power source 520a may lead to additional configurations. Any removable power source compatible with the adapter 580c may replace the removable power source 520c in the configuration 505c of FIG. 5D. Generally, as discussed above, adapters for removable power sources may increase flexibility and choice of configurations vis-à-vis adapters that are integrated into removable power sources.

In operation, configurations 505a, 505b, and/or 505c may allow the components disposed within the band-shaped housing 510 to use energy stored within corresponding removable power sources 520a, and/or 520c. As discussed above, some components disposed within the band-shaped housing 510 may draw energy from the internal power source, which in turn may draw energy from the corresponding removable power source (one of 520a, 520b, and/or 520c).

In some implementations, the smart ring may be configured to operate in one of a plurality of power modes. Selecting an operating power mode may be based at least in part upon whether a removable power source (e.g., one of 520a, 520b, and/or 520c) is disposed at the band-shaped housing 510 and charging the internal power source.

A method of operating a smart ring (e.g., the smart ring 101, 405 or smart rings in configurations 505a, 505b, and/or 505c) may include detecting that a removable power source (e.g., one of the removable power sources 520a, 520b, and/or 520c) is disposed at an outer surface of a housing (e.g., the housing 510). The detection may include detecting that the removable power source is supplying energy to the internal power source of the smart ring. In response to detecting the removable power source at the housing, a controller (e.g., the controller 140) may switch the smart ring into an operating mode that consumes energy at a higher rate (than when the external power source is not detected) to perform certain functions of the smart ring. The operating mode of the smart ring configuration with a removable power source (e.g., configurations 505a, 505b, and/or 505c) that consumes energy at the higher rate may be referred to as a high-power mode.

For example, the controller of the smart ring may activate a communication unit (e.g., communication unit 160) or input and output units (e.g., user input unit 170, output unit 190) when operating in the high-power mode. In some implementations, the smart ring may sense and log (e.g., in the memory unit 144) biometric or movement information using one or more sensors (e.g., sensors 150). Upon detecting (e.g., by the sensor disposed within or at the housing 510) that the removable power source is connected to the housing 510, the controller may activate the communication unit that may initiate advertising a connection for the purpose of transferring the logged data. Additionally or alternatively, the controller may activate, in response to the sensor detecting that the removable power source is present at the band-shaped housing 510, a display or another output device. The output device may then communicate information based at least in part upon the logged data with the user.

In some implementations, the method may include detecting that the removable power source is not connected to the smart ring and, in response, switching the smart ring into a low-power mode. The low-power mode may include reduced smart ring functionality, for example, to only sensing, as described above. In other implementations, the low power mode may include only maintaining the state (e.g., volatile memory) of the control unit while a user replaces the removable power source. Generally, multiple power modes may be configured depending on the energy resources available to the smart ring. Transitions between some of the power modes may depend on detecting changes to the connection of the removable power source to the smart ring.

The removable power source (e.g., any of 520a, 520b, and/or 520c) may connect to the housing (e.g., the housing 510) via an adapter (e.g., the adapters 580a, 580b, and/or 580c) as discussed above. In some implementations, detecting whether the removable power source is connected to the smart ring may be mediated by the adapter. For example, deformation in the adapter or a change in conductivity between two points of the adapter may be sensed to detect the presence of the removable power source.

Generally, an adapter may facilitate a mechanical connection, an electrical connection, or a communicative connection between the removable power source and the band shaped housing with the internal power source. Furthermore, the adapter may facilitate sensing whether the removable power source is connected.

Examples of Other Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

The described functions may be implemented, in whole or in part, by the devices, circuits, or routines of the system 100 shown in FIG. 1. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present disclosure has been described with reference to specific examples, which are intended to be illustrative only and not to be limiting of the present disclosure, it will be apparent to those of ordinary skill in the art that changes, additions or deletions may be made to the disclosed embodiments without departing from the spirit and scope of the present disclosure.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification may not be all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements may not be limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following:

A is true (or present) and B is false (or not present), A is false (or not present) and B is true (or present), and both A and B are true (or present).

In addition, use of the "a" or "an" are employed to describe elements and components of the embodiments herein. Generally speaking, when a system or technique is described as including "a" part or "a" step, the system or technique should be read to include one or at least one part or step. Said another way, for example, a system described as including a blue widget may include multiple blue widgets in some implementations (unless the description makes clear that the system includes only one blue widget).

Throughout this specification, some of the following terms and phrases are used.

Communication Interface according to some embodiments: Some of the described devices or systems include a "communication interface" (sometimes referred to as a "network interface"). A communication interface enables the system to send information to other systems and to receive information from other systems, and may include circuitry for wired or wireless communication.

Each described communication interface or communications unit (e.g., communications unit 160) may enable the device of which it is a part to connect to components or to other computing systems or servers via any suitable network, such as a personal area network (PAN), a local area network (LAN), or a wide area network (WAN). In particular, the communication unit 160 may include circuitry for wirelessly connecting the smart ring 101 to the user device 104 or the network 105 in accordance with protocols and standards for NFC (operating in the 13.56 MHz band), RFID (operating in frequency bands of 125-134 kHz, 13.56 MHz, or 856 MHz to 960 MHz), Bluetooth (operating in a band of 2.4 to 2.485 GHz), Wi-Fi Direct (operating in a band of 2.4 GHz or 5 GHz), or any other suitable communications protocol or standard that enables wireless communication.

Communication Link according to some embodiments: A "communication link" or "link" is a pathway or medium connecting two or more nodes. A link between two end-nodes may include one or more sublinks coupled together via one or more intermediary nodes. A link may be a physical link or a logical link. A physical link is the interface or medium(s) over which information is transferred, and may be wired or wireless in nature. Examples of physicals links may include a cable with a conductor for transmission of electrical energy, a fiber optic connection for transmission of light, or a wireless electromagnetic signal that carries information via changes made to one or more properties of an electromagnetic wave(s).

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/ channel via different sub-bands or sub-channels. As another example, signals may sometimes be transmitted via the same band by allocating time slots over which respective transmitters and receivers use the band in question.

Memory and Computer-Readable Media according to some embodiments: Generally speaking, as used herein the phrase "memory" or "memory device" refers to a system or device (e.g., the memory unit 144) including computer-readable media ("CRM"). "CRM" refers to a medium or media accessible by the relevant computing system for placing, keeping, or retrieving information (e.g., data, computer-readable instructions, program modules, applications, routines, etc.). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information, and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network according to some embodiments: As used herein and unless otherwise specified, when used in the context of system(s) or device(s) that communicate information or data, the term "network" (e.g., the networks 105 and 440) refers to a collection of nodes (e.g., devices or systems capable of sending, receiving or forwarding information) and links which are connected to enable telecommunication between the nodes.

Each of the described networks may include dedicated routers responsible for directing traffic between nodes, and, in certain examples, dedicated devices responsible for configuring and managing the network. Some or all of the nodes may be also adapted to function as routers in order to direct traffic sent between other network devices. Network devices may be inter-connected in a wired or wireless manner, and network devices may have different routing and transfer capabilities. For example, dedicated routers may be capable of high-volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. If desired, each described network may include networks or sub-networks, such as a local area network (LAN) or a wide area network (WAN).

Node according to some embodiments: Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Processor according to some embodiments: The various operations of example methods described herein may be performed, at least partially, by one or more processors (e.g., the one or more processors in the processor unit 142). Generally speaking, the terms "processor" and "micropro-cessor" are used interchangeably, each referring to a com-puter processor configured to fetch and execute instructions stored to memory. By executing these instructions, the processor(s) can carry out various operations or functions defined by the instructions. The processor(s) may be tem-porarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic com-ponents in an integrated circuit that is typically configured to provide I/O and memory management functions as well as a plurality of general purpose or special purpose registers, timers, etc. Generally speaking, one or more of the described processors may be communicatively coupled to other com-ponents (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equiva-lent to the described embodiments. Accordingly, it is to be understood that the present disclosure is not to be limited by the specific illustrated embodiments.

The invention claimed is:

1. A charging system comprising:
a ring housing comprising:
an inner surface configured to contact a finger of a user when the ring housing is worn by the user;
an internal power source configured to be wirelessly charged by a removable power source; and
a component configured to draw energy from the inter-nal power source; and
a removable power source housing configured to be removably coupled to the ring housing and devoid of being worn on the finger of the user, the removable power source comprising:
a first LED activated in response to a first activity at the removable power source; and
a second LED activated in response to a second activity at the removable power source, wherein the second LED is different from the first LED, and the second activity is different from the first activity.

2. The charging system of claim 1, wherein:
one or more of the first LED or the second LED are disposed on the removable power source.

3. The charging system of claim 1, wherein:
the ring housing is configured for a friction fit with the removable power source housing.

4. The charging system of claim 1, wherein:
the removable power source is configured to charge the ring housing while the user is wearing the ring housing.

5. The charging system of claim 1, wherein:
the removable power source is an electrical charger con-figured to inductively transfer power to the internal power source.

6. The charging system of claim 1, wherein:
the ring housing is configured for a friction fit with the removable power source.

7. The charging system of claim 1, wherein:
the removable power source is integrated into an object in an environment of the user.

8. The charging system of claim 1, further comprising:
a controller configured to detect a presence of the ring housing at the removable power source.

9. The charging system of claim 1, wherein:
the ring housing is configured to operate in a power mode based on a presence of the removable power source adjacent to the ring housing.

10. The charging system of claim 1, wherein:
one or more of the first activity or the second activity comprises a presence of the removable power source adjacent to the ring housing.

11. A method of providing a charging system, comprising:
providing a ring housing, comprising:
providing an inner surface configured to contact a finger of a user when the ring housing is worn by the user;
providing an internal power source configured to be wirelessly charged by a removable power source; and
providing a component configured to draw energy from the internal power source;
providing a removable power source housing configured to be removably coupled to the ring housing and devoid of being worn on the finger of the user, the removable power source housing comprising:
providing a first LED activated in response to a first activity at the removable power source; and
providing a second LED activated in response to a second activity at the removable power source, wherein the second LED is different from the first LED, and the second activity is different from the first activity.

12. The method of claim 11, further comprising:
disposing one or more of the first LED or the second LED on the removable power source.

13. The method of claim 11, wherein:
the ring housing is configured for a friction fit with the removable power source housing.

14. The method of claim 11, wherein:
the removable power source is configured to charge the ring housing while the user is wearing the ring housing.

15. The method of claim 11, wherein:
the removable power source is an electrical charger con-figured to inductively transfer power to the internal power source.

16. The method of claim 11, wherein:

the ring housing is configured for a friction fit with the removable power source.

17. The method of claim 11, wherein:

the removable power source is integrated into an object in an environment of the user.

18. The method of claim 11, further comprising at least one of:

providing a controller configured to detect a presence of the ring housing at the removable power source; or one or more of the first activity or the second activity comprises a presence of the removable power source adjacent to the ring housing.

19. The method of claim 11, further comprising:

operating the ring housing in a power mode based on a presence of the removable power source adjacent to the ring housing.

20. A charging system comprising:

a ring housing comprising:

an inner surface configured to contact a finger of a user;

an internal power source configured to be wirelessly charged by a removable power source; and a light source configured to draw energy from the internal power source;

a removable power source housing configured to be removably coupled to the ring housing and devoid of being worn on the finger of the user, the removable power source housing comprising:

a first LED activated in response to a first activity at the removable power source; and a second LED activated in response to a second activity at the removable power source, wherein the second LED is different from the first LED, and the second activity is different from the first activity.

* * * * *